US012194504B2

(12) United States Patent
Harris et al.

(10) Patent No.: US 12,194,504 B2
(45) Date of Patent: Jan. 14, 2025

(54) MELEE GEMSTONE SORTING

(71) Applicant: De Beers UK Ltd, London (GB)

(72) Inventors: Philip Harris, Berkshire (GB); Peter Stanley Rose, Buckinghamshire (GB); Andrew Portsmouth, Berkshire (GB); Trevor Anthony Harries, Buckinghamshire (GB); Colin McGuinness, Berkshire (GB); David Fisher, Berkshire (GB)

(73) Assignee: De Beers UK Ltd, London (GB)

( * ) Notice: Subject to any disclaimer, the term of this patent is extended or adjusted under 35 U.S.C. 154(b) by 0 days.

(21) Appl. No.: 18/709,297

(22) PCT Filed: Nov. 9, 2022

(86) PCT No.: PCT/GB2022/052838
§ 371 (c)(1),
(2) Date: May 10, 2024

(87) PCT Pub. No.: WO2023/084210
PCT Pub. Date: May 19, 2023

(65) Prior Publication Data

US 2024/0326097 A1 Oct. 3, 2024

(30) Foreign Application Priority Data

Nov. 12, 2021 (GB) ..................................... 2116313

(51) Int. Cl.
*B07C 5/02* (2006.01)
*B07C 5/342* (2006.01)

(52) U.S. Cl.
CPC .............. *B07C 5/02* (2013.01); *B07C 5/3425* (2013.01)

(58) Field of Classification Search
CPC ......... B07C 5/02; B07C 5/342; B07C 5/3425; B07C 5/36; B07C 2501/0063
See application file for complete search history.

(56) References Cited

U.S. PATENT DOCUMENTS 4,784,493 A * 11/1988 Turcheck, Jr. ............ B07C 5/02 198/395
5,193,685 A * 3/1993 Trevithick ............ B07C 5/3427 209/552

(Continued)

FOREIGN PATENT DOCUMENTS

GB 2490330 A 10/2012
GB 2528303 A 1/2016

(Continued)

OTHER PUBLICATIONS

International Preliminary Report on Patentability for Application No. PCT/GB2022/052838, mailed on May 23, 2024, 7 pages.

(Continued)

*Primary Examiner* — Joseph C Rodriguez

(57) ABSTRACT

A method of sorting gemstones comprises receiving one or more gemstones at a collection location; determining, at the collection location, that one of the one or more gemstones is correctly oriented; transferring the correctly oriented gemstone from the collection location onto a moveable surface using an automated arm; transporting the gemstone upon the moveable surface to one or more measurement locations; measuring one or more properties of the gemstone at the one or more measurement locations while the gemstone is supported upon the moveable surface; and sorting the gemstone based upon the one or more measured properties.

35 Claims, 11 Drawing Sheets

(56) References Cited

U.S. PATENT DOCUMENTS

| | | | | |
|---|---|---|---|---|
| 11,541,429 | B2 * | 1/2023 | Portsmouth | G01N 33/389 |
| 2015/0015877 | A1 * | 1/2015 | Smith | G01N 33/24<br>356/402 |
| 2017/0036245 | A1 * | 2/2017 | DeFillipi | B07C 5/342 |
| 2018/0284030 | A1 * | 10/2018 | Smith | G01N 21/87 |
| 2020/0094289 | A1 * | 3/2020 | Portsmouth | G01N 33/389 |
| 2023/0100222 | A1 * | 3/2023 | Ben Shmuel | B24B 51/00<br>125/30.01 |

FOREIGN PATENT DOCUMENTS

| | | | |
|---|---|---|---|
| GB | 2542142 | A | 3/2017 |
| GB | 2558247 | A | 7/2018 |
| WO | 2011037481 | A1 | 3/2011 |
| WO | 2014/067932 | A1 | 5/2014 |
| WO | 2017/055852 | A1 | 4/2017 |
| WO | 2018/115889 | A1 | 6/2018 |

OTHER PUBLICATIONS

International Search Report and Written Opinion for Application No. PCT/GB2022/052838, mailed on Jan. 20, 2023, 12 pages.

Search Report for Application No. GB 2116313.4, mailed on May 13, 2022, 3 pages.

First Office Action issued in Chinese Application No. 202280088320.X, mailed on Sep. 26, 2024, 17 pages.

* cited by examiner

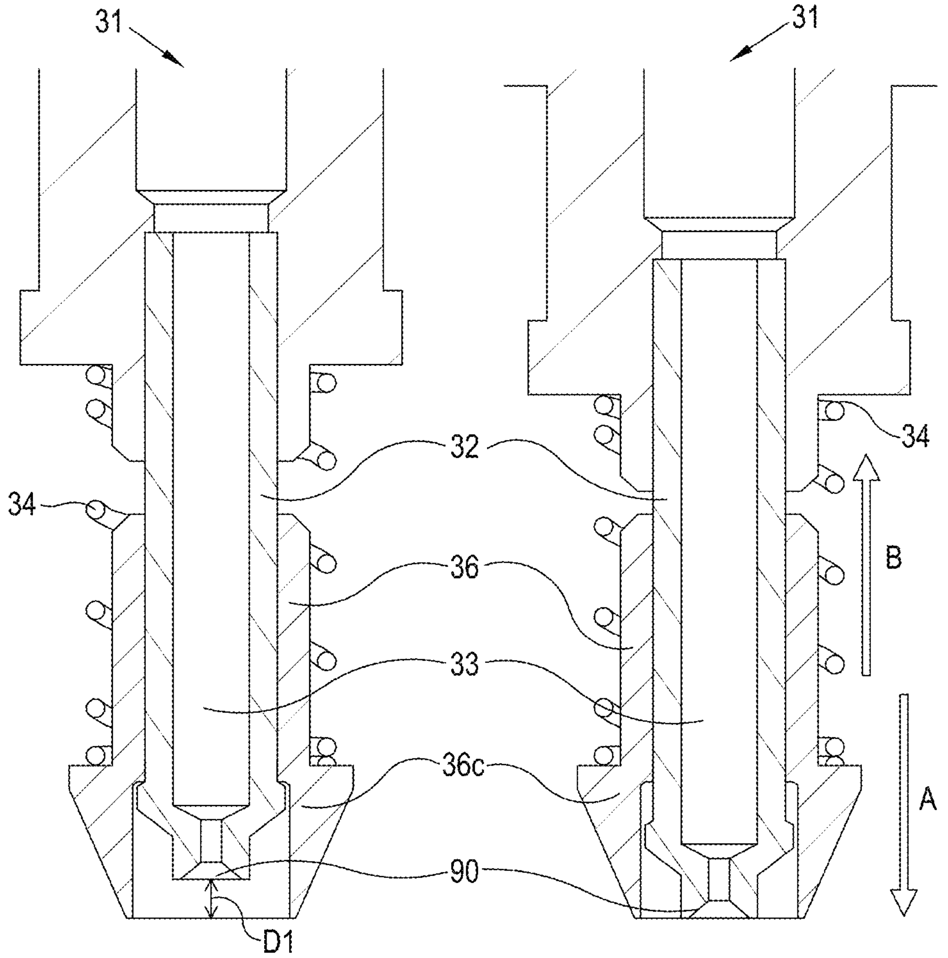
Figure 6a
Figure 6b
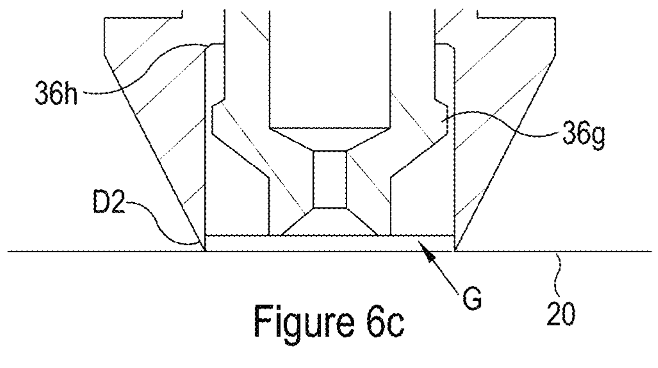
Figure 6c

MELEE GEMSTONE SORTING

CROSS-REFERENCE TO RELATED APPLICATIONS

This application is a national phase application of International Patent Application No. PCT/GB2022/052838 filed on Nov. 9, 2022, which is based on and claims the priority to Great Britain Patent Application No. 2116313.4 filed on Nov. 12, 2021. The content of all of the above applications is incorporated herein by reference in their entirety.

TECHNICAL FIELD

The present invention relates to a method and an apparatus for sorting gemstones. In particular, although not exclusively, the invention relates to a method and an apparatus for sorting very small gemstones of between 0.1 to 0.3 points in size.

BACKGROUND

Reference is made to various techniques for sorting gemstones, in particular, very small gemstones. Advanced screening instruments, such as the DiamondSure™ and DiamondView™, may be used to test whether a cut and polished diamond is natural or synthetic. Typically, such screening involves measuring the way in which light is absorbed by or emitted from a diamond. Before screening commences it may be preferable for the stone being tested to be placed "table-down" in a precise location on the measurement surface or holder. In this context, the "table" is the largest central facet of the crown (the top portion, or exposed portion, of the stone when mounted in a ring, for example). WO2018/115889 proposes an apparatus which may be used for screening gemstones and for sorting the stones according to the result of the screening.

SUMMARY OF INVENTION

In one aspect, a method of sorting gemstones is provided. The method comprises receiving one or more gemstones at a collection location; determining, at the collection location, that one of the one or more gemstones is correctly oriented; transferring the correctly oriented gemstone from the collection location onto a moveable surface using an automated arm; transporting the gemstone upon the moveable surface to one or more measurement locations; measuring one or more properties of the gemstone at the one or more measurement locations while the gemstone is supported upon the moveable surface; and sorting the gemstone based upon the one or more measured properties. The gemstones may be substantially between 0.1 to 0.3 points.

The moveable surface may be a rotatable disc. The transferring may comprise halting the rotatable disc, dispensing the gemstone onto a surface of the rotatable disc; and turning the rotatable disc by a predetermined angle. The predetermined angle may be 9 degrees.

The method may comprise transferring a first correctly oriented gemstone onto the moveable surface, while the moveable surface is stationary, while measuring one or more properties of a second gemstone at at least one of the one or more measurement locations. The method may comprise transferring the first correctly oriented gemstone onto the moveable surface, while the moveable surface is stationary, while measuring one or more properties of the second gemstone at at least one of the one or more measurement locations, and while dispensing a third gemstone off the moveable surface.

The method may comprise measuring one or more properties of a first gemstone at at least one of the one or more measurement locations while transporting a second gemstone upon the moveable surface, wherein the moveable surface is non-stationary. One of the at least one measurement locations may comprise a luminescence measurement cell. One of the at least one measurement locations may comprise a photoluminescence measurement cell. Measuring at least one of the one or more properties of the gemstone may comprise illuminating the gemstone using a beam of light having an incidence angle of substantially 10 degrees measured from a horizontal plane.

The method may comprise transporting the gemstone through the measurement location during the measuring. Each of the one or more gemstones may be sorted based upon one or more measurement results identifying the gemstone as natural or synthetic. The method may comprise moving the moveable surface at a first speed and at a second speed, wherein the second speed is less than the first speed.

The method may comprise sorting the gemstones by further transporting the gemstone to a dispensing location and dispensing the gemstone off the moveable surface based upon the one or more measured properties of the gemstone.

The method may comprise receiving one or more gemstones at the collection location from a hopper, and controlling, by the hopper, the flow of the one or more gemstones onto the collection location. The method may comprise controlling the flow of the one or more gemstones via an end hopper wall, the end hopper wall defining an aperture at a base thereof. The hopper may be provided with at least one substantially curved internal surface.

The method may comprise obtaining an image of one of the one or more gemstones at the collection location and analysing the obtained image to determine an orientation of the gemstone. Where the orientation is determined to be correct, the method may comprise designating the imaged gemstone for transfer to the moveable surface. When the orientation is determined to be incorrect, the method may comprise causing the collection location to vibrate such that the imaged gemstone is re-oriented.

The method may comprise causing the collection location to vibrate once all gemstones at the collection location that are determined to be correctly oriented have been transferred from the collection location onto the moveable surface.

The orientation may be determined to be correct when the imaged gemstone is determined to be in a table-down orientation.

The method may comprise providing the automated arm with a vacuum nozzle at one end thereof, supplying negative pressure to an aperture of the vacuum nozzle in order to pick up an individual gemstone with the aperture, and supplying positive pressure to the vacuum nozzle in order to dispense the gemstone off the aperture onto the moveable surface. The method may comprise providing the vacuum nozzle with an annular collar and substantially surrounding the aperture with the collar while the gemstone is being dispensed off the aperture.

The method may comprise measuring one or more properties of the gemstone at the one or more measurement locations while the moveable surface is stationary; and measuring one or more properties of the gemstone at the one or more measurement locations while the moveable surface is non-stationary.

In another aspect, an apparatus for sorting gemstones comprises a collection location configured to receive one or more gemstones; an image capture device configured to obtain one or more images of the one or more gemstones at the collection location; a processor configured to analyse the one or more images and to determine whether one or more of the one or more gemstones is correctly oriented; an automated arm configured to transfer a correctly oriented gemstone from the collection location onto a moveable surface; the moveable surface, configured to transport the gemstone to one or more measurement locations; and the one or more measurement locations, configured to measure one or more properties of the gemstone while the gemstone is supported upon the moveable surface. The gemstones may be substantially between 0.1 to 0.3 points.

The moveable surface may be a rotatable disc. The apparatus may further comprise a controller configured to incrementally move the rotatable disc through a predetermined angle, preferably 9 degrees. The controller may be configured to control the moveable surface to be stationary during transfer of the gemstone onto the moveable surface. The controller may be configured to control the moveable surface to be non-stationary during measurement of one or more properties of a gemstone.

One of the at least one measurement locations may comprise one of: a luminescence measurement cell, a photoluminescence measurement cell. The apparatus may further comprise an illumination arrangement at one or more of the measurement locations, configured to illuminate the gemstone supported upon the moveable surface at a predetermined illumination angle, preferably an illumination angle of substantially 10 degrees measured from a horizontal plane.

The moveable surface may be controlled to move at a first speed and at a second, lower speed, the moveable surface configured to move at the second, lower speed as the gemstone is transported through one of the one or more measurement locations.

The apparatus may comprise one or more dispensing locations, each including a dispensing mechanism and a dispensing bin. The apparatus may comprise a hopper configured to provide one or more gemstones to the collection location. The hopper may be provided with an end wall defining an aperture at a base thereof, and may be configured to control a flow of gemstones to the collection location via the aperture.

A body of the hopper may generally slope towards the aperture at an angle of substantially 3 degrees measured from horizontal. The end wall may be inwardly angled at an angle of substantially 75 degrees measured from horizontal.

The apparatus may comprise a vibration mechanism configured to vibrate the collection location in order to correctly orient one or more of the gemstones at the collection location.

The apparatus may comprise a vacuum nozzle connected to an end of the automated arm, said vacuum nozzle comprising an aperture for receiving a gemstone and an annular collar configured to surround the aperture.

BRIEF DESCRIPTION OF FIGURES

FIGS. 5, 6*a*, 6*b*, 6*c* and 7 illustrate a nozzle;

DETAILED DESCRIPTION

Figure 1:
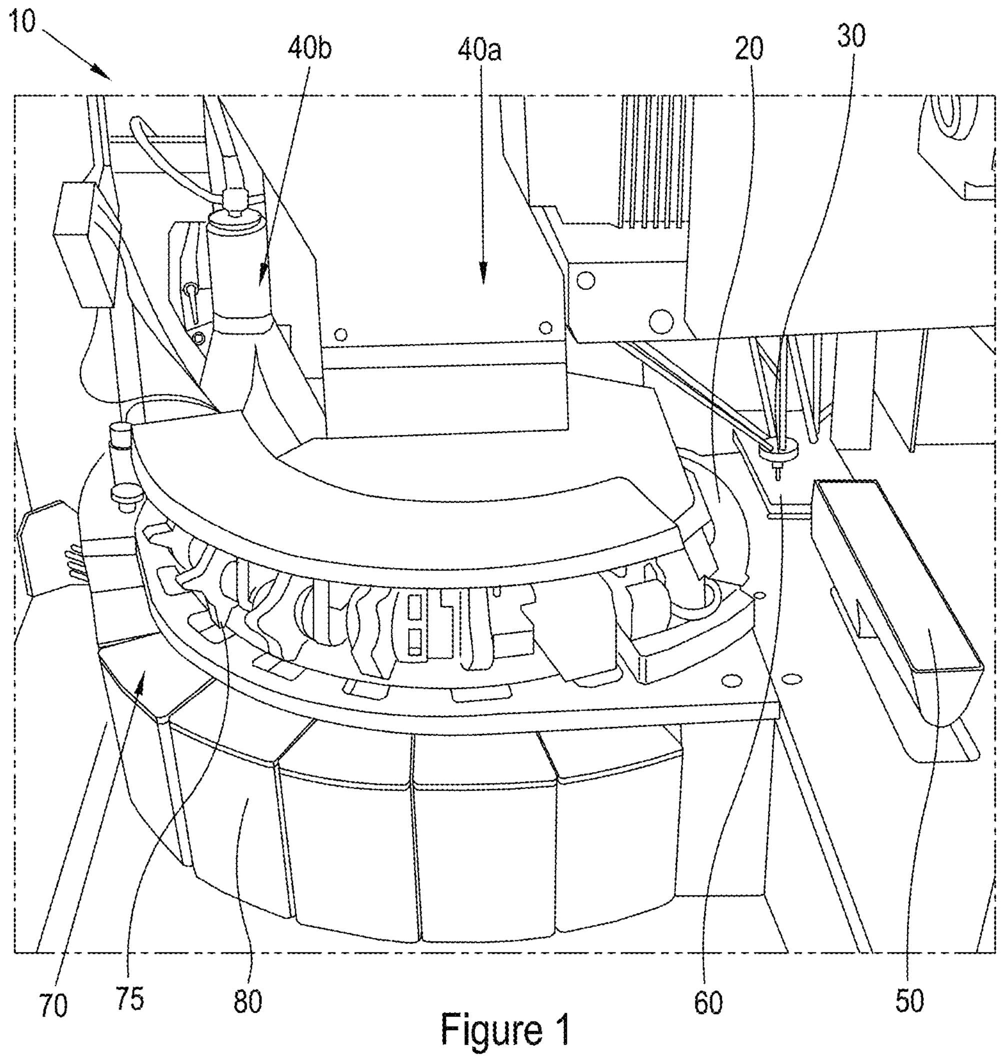
FIG. 1 illustrates an apparatus for sorting gemstones.

Described herein with reference to FIGS. 1 to 10 are embodiments of an apparatus and a method for sorting gemstones. Although reference may be made to diamonds, the present invention is not limited thereto and may encompass other gemstone types.

Natural diamonds consist exclusively of diamond formed by natural geological processes over long periods of time. Synthetic diamonds are man-made stones manufactured by industrial processes, such as high pressure high temperature (HPHT) and chemical vapour deposition (CVD).

Synthetic diamonds have a wide range of industrial applications, but do not attract the high values associated with natural diamonds of similar colour and quality. Synthetic diamonds may be relatively easy to distinguish from natural diamonds when in an unpolished state, however, once polished and cut into a gemstone, identification of a stone as synthetic may be more difficult.

Advanced screening instruments, such as the DiamondSure™ and DiamondView™, may be used to test whether a cut and polished diamond is natural or synthetic. Typically, such screening involves measuring the way in which light is absorbed by or emitted from a diamond. Before screening commences it may be preferable for the stone being tested to be placed "table-down" in a precise location on the measurement surface or holder. In this context, the "table" is the largest central facet of the crown (the top portion, or exposed portion, of the stone when mounted in a ring, for example). WO2018/115889 proposes an apparatus which may be used for screening gemstones and for sorting the stones according to the result of the screening.

In addition to screening larger, individual stones, one may also wish to screen large numbers of smaller diamonds, including cut and polished stones sometimes known as melee. Melee is a term of the trade that does not have a well-defined size range, but can be considered in practice to refer to stones or chips smaller than about 0.2 carats (20 points). Such stones may have a diameter of less than around 3.5 mm. However, the term melee may also include very small stones of around 0.001 to 0.003 carats (0.1 to 0.3 points), of diameter between around 0.65 to 0.90 mm.

Due to their small size, melee stones are typically sold in parcels or lots. Since one parcel may contain hundreds of stones, it is possible for synthetic diamonds and non-diamond material, such as glass and cubic zirconia, to be mixed in with natural stones. Screening of melee diamonds can potentially be extremely time consuming, since each stone must be tested individually and therefore placed in the correct orientation individually.

For very small melee stones, e.g. 0.1 to 0.3 point stones, as described above, other issues may be, but are not limited to: stones becoming lost or trapped within the sorting apparatus; induction of an electrostatic charge on the stones, making them much more difficult to handle both mechanically and manually; and parcels of stones supplied from industry sometimes having a very light greasy coating as a result of not being cleaned properly after manufacture, causing stones to stick and result in poor feed efficiency. The surface area of very small melee stones is large compared with their volume and so the electrostatic charge induced on such small stones by known feeding and orientation techniques may be high. Typically, mitigation of electrostatically charged stones may need to be addressed by the use of ionisers and/or closed loop humidifier systems.

In one embodiment, the apparatus for sorting gemstones comprises a collection location configured to receive one or more gemstones; an image capture device configured to obtain one or more images of the one or more gemstones at the collection location; a processor configured to analyse the one or more images and to determine whether one or more of the one or more gemstones is correctly oriented; an automated arm configured to transfer a correctly oriented gemstone from the collection location onto a moveable surface; the moveable surface, configured to transport the gemstone to one or more measurement locations; and the one or more measurement locations, configured to measure one or more properties of the gemstone while the gemstone is supported upon the moveable surface.

In one embodiment, the method comprises receiving one or more gemstones at a collection location; determining, at the collection location, that one of the one or more gemstones is correctly oriented; transferring the oriented gemstone from the collection location onto a moveable surface using an automated arm; transporting the gemstone upon the moveable surface to one or more measurement locations; measuring one or more properties of the gemstone at the one or more measurement locations while the gemstone is supported upon the moveable surface; and sorting the gemstone based upon the one or more measured properties.

In certain embodiments, the gemstones are diamonds, optionally melee diamonds. The gemstones may be between around 0.1 to 0.3 points (for example, between around 0.001 to 0.003 carats with diameter of around 0.65 mm to 0.90 mm). In one embodiment, the gemstones have a diameter, or maximum dimension, of less than 0.8 mm. The gemstones may be small, round brilliant polished diamonds, in particular cut diamonds, having a table facet and a culet. Other gemstone cuts and shapes may also be envisaged.

The apparatus according to the present invention has been designed with very small melee gemstones in mind. Known apparatuses that are designed to handle larger gemstones would need to be adapted in order to sort such very small gemstones.

In one embodiment, the apparatus comprises a moveable surface or platform, which is configured to support gemstones thereon; one or more measurement locations; and one or more dispensing locations. The apparatus may further comprise a feeder arrangement configured to feed a parcel, including a plurality of gemstones onto the moveable surface. In one embodiment, the feeder arrangement comprises a collection area from which individual gemstones can be collected (picked up) and transferred one by one to the moveable surface. The collection area also serves as an orientation area in which gemstones are oriented into a most stable orientation. The feeder arrangement may further comprise a hopper configured to receive a plurality of gemstones therein and gemstones may be dispensed onto the collection area from the hopper. The feeder arrangement may further comprise a transfer mechanism configured to pick up and transfer individual gemstones from the collection area and onto the moveable surface.

In the embodiment shown in FIG. 1, an apparatus 10 configured to sort gemstones comprises a moveable surface in the form of a rotatable disc 20. The rotatable disc 20 is configured to transport the gemstones supported thereon to the one or more measurement locations 40*a*, 40*b*, and to the one or more dispensing locations 70. The one or more measurement locations 40*a*, 40*b*, and the one or more dispensing locations 70 are provided around a circumference of the rotatable disc. 20. An upper surface of the rotatable disc 20 is substantially horizontal and flat. The surface of the disc on which the gemstones are transported is substantially unbroken, such that it does not comprise recesses or compartments in which gemstones could become trapped.

A disc configuration, as illustrated in FIG. 1, can be advantageous in that multiple stations (e.g. measurement locations, dispensing locations) can be accommodated in a compact space. Additionally, any gemstones, which for whatever reason are not dispensed at the dispensing locations, can be transported by the disc back to the measurement locations, for example. However, in other embodiments, not illustrated herein, the moveable surface may be a linear conveyor.

As shown in FIG. 1, each dispensing location 70 includes a dispensing mechanism, such as a rotating wheel 75, and a dispensing bin or container 80. In some embodiments, each dispensing bin is provided with a corresponding dispensing mechanism. Each dispensing bin is designated for receipt of gemstones having predetermined measurement results. In alternative embodiments, not illustrated herein, the dispensing mechanism comprises a push bar, a low pressure (vacuum) nozzle, a compressed air nozzle, or the like, configured to dispense or otherwise remove a specific gemstone from the moveable surface.

In the embodiment illustrated in FIG. 1, the feeder arrangement comprises a hopper 50, a collection area in the form of a light table 60 and a transfer mechanism in the form of an automated arm 30, which includes a pick-up nozzle. It will be appreciated, however, that in other embodiments one or more of the components of the feeder arrangement are modified or replaced.

Figure 2A:
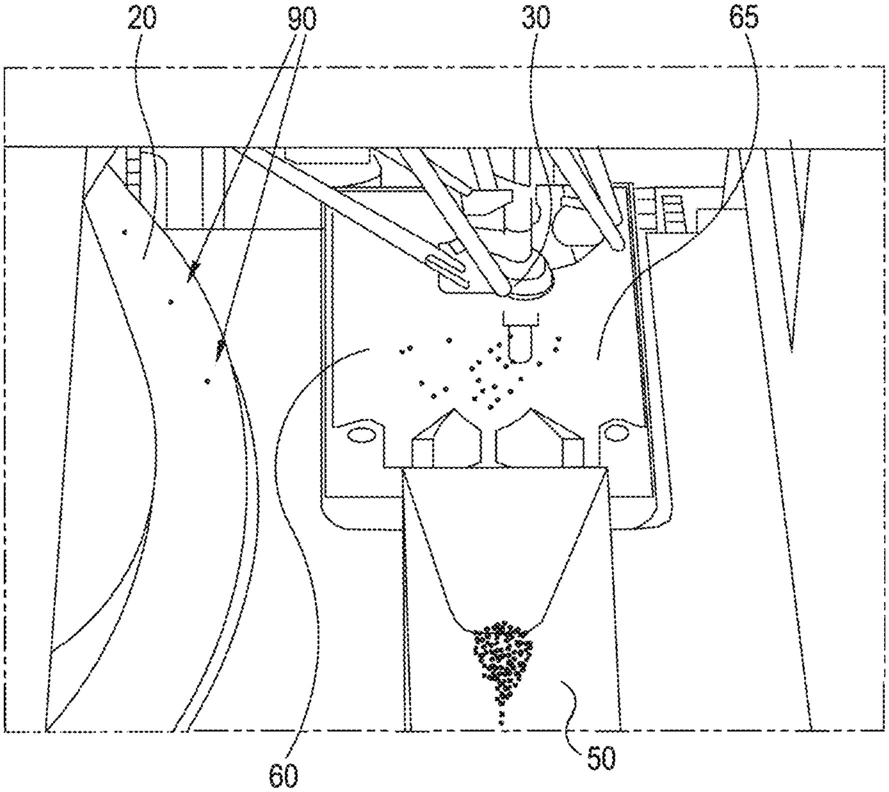
FIG. 2*a* illustrates a hopper and a light table.
Figure 2B:
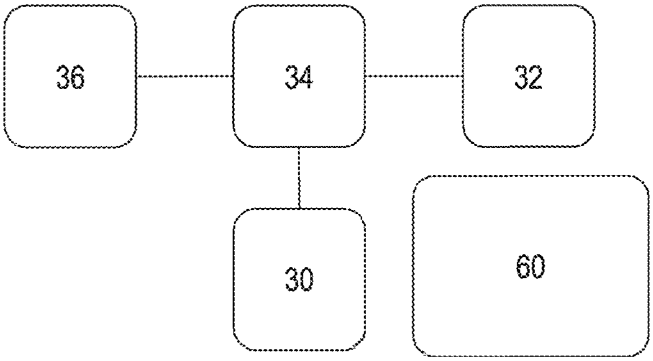
FIG. 2*b* illustrates a schematic of a vision system.

FIGS. 2*a* and 2*b* illustrate the feeder arrangement shown in the embodiment of FIG. 1 in greater detail. In this embodiment, the hopper 50 is configured to receive gemstones therein and to move the gemstones towards an end of the hopper adjacent the light table 60 (the collection area). The hopper 50 comprises a vibratory mechanism (not shown here) which causes a body of the hopper 50 to vibrate, thus moving the gemstones along the hopper 50 body and towards the light table 60. However, the hopper 50 does not necessarily orient the gemstones into any particular orientation.

As will be described in more detail below, in one embodiment the hopper 50 is configured to dispense gemstones onto the light table 60 (the collection area). However, the hopper 50 is configured to control or limit the flow of gemstones onto the light table 60 (the collection area). In the embodiment of FIG. 2*a*, this control is achieved by providing a dam at the end of the hopper 50 adjacent the light table 60. The dam comprises, or is formed by, an end wall or plate defining a small aperture or porthole at the base of the hopper 50.

In the embodiment of FIG. 2*a*, the light table 60 provides a collection area or pick-up zone where gemstones can be picked up by the automated arm 30 and transferred one by one to the moveable surface 20. The light table 60 of FIG. 2*a* comprises a substantially flat surface or base 65 surrounded by one or more walls. The light table 60 is substantially square in shape, although other configurations for the collection area may be provided. In some embodiments, the light table 60 is formed from a plastics material or the like.

In one embodiment, the light table 60 is configured to receive one or more gemstones from the hopper 50 upon the flat surface or base 65 of the light table 60. It will be appreciated that, as the gemstones fall or are transferred from the hopper 50 onto the flat surface 65 of the light table 60, via the hopper 50 porthole, the gemstones may come to rest in a number of different orientations. For example, a cut gemstone may come to rest upon a substantially flat table facet, or may come to rest upon a pavilion facet.

To facilitate placement of a gemstone upon the moveable surface 20 and/or to ensure accurate measurement(s) of the gemstone at the one or more measurement locations 40*a*, 40*b*, it may be desirable to orient a gemstone into a table-down position, such that the gemstone is resting upon the substantially flat table facet, as described above. A table-down position generally represents the most stable orientation for a cut gemstone e.g. the orientation from which the gemstone is least likely to move.

As illustrated in FIG. 2*a*, the light table 60, or at least the flat base 65 thereof, comprises a vibratory mechanism (not shown herein) configured to vibrate the light table 60 periodically in order to re-orient any gemstones resting upon the base 65. As this vibration of the light table 60 occurs, any gemstones not already in a table-down position can be re-oriented. Once a gemstone is in the table-down position, the light table 60 is configured such that that gemstone is unlikely to be re-oriented by further vibration of the light table 60. In other words, gemstones held within the light table 60 are repeatedly vibrated until they are in the table-down position, at which point they remain in the table-down position even when further vibration takes place. In this respect, the light table 60 provides an orientation area as well as a collection area. Further description of the vibration of the light table 60 will be provided below.

In the embodiment of FIG. 2*a*, the transfer mechanism, e.g. the automated arm 30, is a robotic arm controlled by a controller (not shown). Suitable robotic arms may be provided by Asyril SA and/or may be SCARA type robots. The robotic arm 30 is fitted with a pick-up nozzle configured to pick up individual gemstones from the flat surface 65 of the light table 60 and to transport and place the individual gemstones one at a time onto the moveable surface 20. The configuration and operation of the pick-up nozzle will be described in more detail below.

In some embodiments, the automated arm 30 and the light table 60 are controlled by the same controller. In other words, the controller is configured to control the vibration of the light table 60 and the actuation or operation of the automated arm 30. In some embodiments, a single controller controls overall operation of all components of the sorting apparatus.

In the embodiment shown in the schematic of FIG. 2*b*, a controller 34 is in communication with an image capture device 32, such as a camera. The image capture device 32 inspects (e.g. captures an image of) the light table 60 (the collection area) from above (or below) the light table 60. This captured image includes at least some of the gemstones supported on the base 65 of the light table 60, and may include all of the gemstones supported on the base 65. In one embodiment, the image capture device 32 is operated by the controller 34. The captured images may be colour or black and white still images of the light table 60 (or portions thereof) and/or colour or black and white video of the light table 60 (or portions thereof). The image capture device 32 may constantly or periodically illuminate the surface of the light table 60 using a light source (not shown). Illumination of the light table may follow a vibration of the light table.

As illustrated in FIG. 2*b*, a processor 36 is provided in communication with the controller 34. The processor 36 is configured to operate software that enables identification of a gemstone supported on the base 65 of the light table 60. For example, the processor 36 may be configured to analyse one or more images of the gemstones present in the light table 60, as captured by the image capture device 32. Where the one or more images are captured from above (or below) the light table 60, a round brilliant cut gemstone that is oriented in a table-down configuration will appear substantially circular in the captured image. In contrast, as imaged from above (or below), a round brilliant cut gemstone that is not in a table-down configuration will appear differently, e.g. substantially non-circular, in the captured image. Therefore, the processor analyses the one or more images of the gemstones and determines based upon this analysis of the one or more images whether a particular gemstone in the light table 60 is oriented in a table-down position, or not. It will be appreciated that where gemstones of different cuts/shapes are being sorted, the analysis and orientation identification may be carried out on the basis of different criteria.

The above-described analysis may also include a determination as to whether the imaged gemstone is a single gemstone or whether the image includes two or more gemstones in direct contact with one another. In this way, pick up of multiple gemstones from the light table can be avoided.

In one embodiment, the processor 36 signals or otherwise indicates to the controller 34 that one or more gemstones in the light table 60 have been determined to be in a table-down configuration and that these one or more gemstones are designated to be picked up individually by the transfer mechanism, such as the automated arm 30. The controller 34 subsequently actuates the automated arm 30 to pick up the one or more designated table-down gemstones from the light table 60, individually. In other words, gemstones in the light table 60, which are not in a table-down configuration, are not picked up by the automated arm 30. It will be appreciated that for gemstones of different shapes, the most stable configuration may not be a table-down configuration, in which case the processor and controller may be configured to designate stones for pick-up based upon different criteria.

The controller 34 is configured to periodically cause the light table 60 to vibrate (e.g. cyclical vibration), using the vibratory mechanism, such that any gemstones not in a table-down configuration can be re-orientated by the vibration of the light table 60. The frequency, length and level of vibration of the light table 60 is determined by the controller 34 and/or the software operated by the processor 36 based upon the specific application, e.g. the number and/or size of gemstones to be reoriented. The light table 60 therefore also provides an orientation or reorientation area.

In one embodiment, the controller 34 is configured to optimise the transfer rate of gemstones from the light table 60 to the moveable surface by determining the optimal time at which to vibrate the light table 60. For example, the controller 34 may wait to vibrate the light table 60 until all table-down gemstones, which are gemstones in a most stable orientation have been picked up and transferred to the moveable surface. Alternatively or additionally, the controller 34 may vibrate the light table 60 while there are still some table-down gemstones present on the light table 60.

In one embodiment, the controller 34 is configured to optimise the transfer rate of the gemstones by designating the order in which correctly-oriented gemstones should be picked up by the automated arm. Although correctly-oriented gemstones are unlikely to be re-oriented from the table-down position during vibration, these gemstones may still move horizontally, and laterally within the light table 60 during vibration. The controller 34 can instruct the automated arm to pick up the correctly-oriented gemstones that are closest to the automated arm (or other pre-determined point).

Figure 2C:
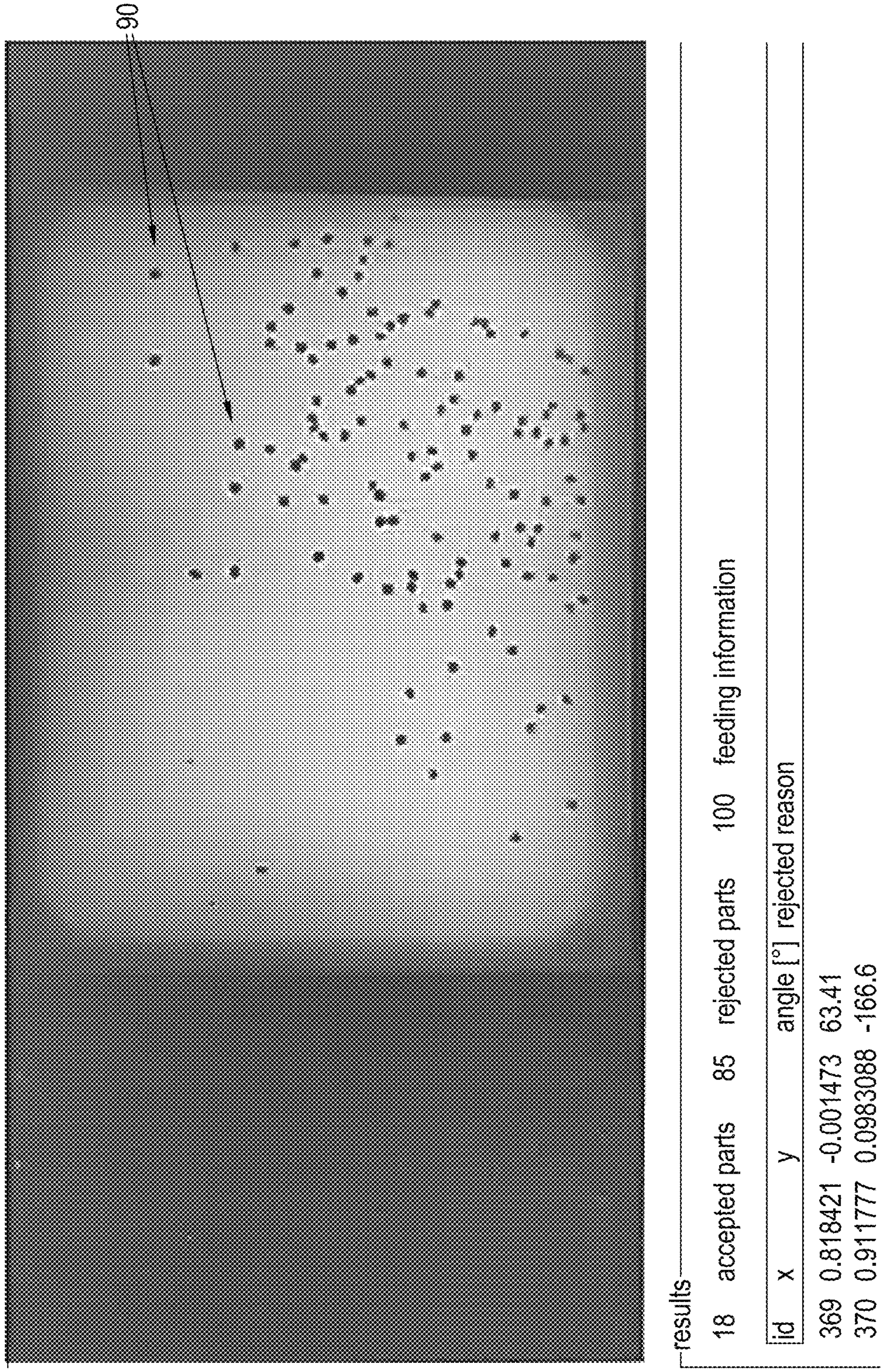
FIG. 2*c* illustrates an image of the light table.

FIG. 2*c* illustrates a captured image of the light table or collection region. In this non-limiting example, the image is shown in the context of a software program, run by the processor, which enables analysis of the gemstones present in/on the light table and which designates one or more correctly oriented gemstones for pick-up by the automated arm (not shown). As can be seen from FIG. 2*c*, the imaged light table contains a number (around 50-60) of small gemstones 90 which in this example are imaged in silhouette. Each gemstone can be rejected as not correctly oriented if the silhouette of that gemstone indicates that the gemstone is not correctly oriented (e.g. table-down). In contrast, in this example a gemstone having a substantially circular silhouette image can be accepted as correctly oriented if the silhouette of that gemstone indicates that the gemstone is table-down.

The use of a light table as a collection area/orientation area between a hopper and the moveable surface may increase the throughput of the sorting apparatus compared with an apparatus not comprising these features. In one embodiment, gemstones are placed on the moveable surface at the rate of one stone per second. This can be achieved as it is not necessary to wait for a single gemstone in a correct (e.g. table-down) orientation to be presented for pick-up by the automated arm. Instead, multiple gemstones can be dispensed from the hopper onto the light table, at least some of which are likely to be in the correct e.g. table-down orientation. These table-down gemstones can be picked up by a transfer mechanism e.g. an automated arm. The provision of a light table also allows the orientation of the gemstones to be pre-checked prior to pick-up and transfer increasing the accuracy and efficiency of the apparatus.

In one example, once the controller has identified a number of appropriately oriented stones, the automated arm will transfer the identified stones individually to the moveable surface. If the number of (total) stones on the light table is below a given number, as determined by the controller, the hopper can be activated to add more stones onto the light table. These stones are then be assessed by the controller as discussed above, and any stones that are correctly oriented are picked up by the automated arm. In one example, once all of the correctly oriented stones present in the light table have been transferred to the moveable surface, the light table is then vibrated again, and so on. Alternatively or additionally, the light table is vibrated in between individual pick-ups, to provide additional table-down gemstones (e.g. pick-up candidates) for pick-up. In one embodiment, the controller avoids vibrating the light table during a pick-up, and/or avoids dispensing additional gemstones from the hopper onto the light table during a pick-up.

The above-described arrangement means that there is generally always at least one correctly-oriented gemstone ready for pick-up by the transfer mechanism (automated arm) at the light table. Indeed, there may be a number of correctly-oriented gemstones available to be selected for pick-up (e.g. multiple pick-up candidates). Therefore, there is no requirement to wait for any particular stone to be correctly oriented prior to pick-up. The identification of a stone as correctly oriented (e.g. by the image capture device and processor) enables multiple gemstones to be located at the pick-up zone. The use of a hopper which gradually feeds a parcel of gemstones onto the light table prevents the light table from being overloaded, and helps increase the accuracy of the orientation determination.

In the embodiment shown in FIG. 2*b*, the light table 60, the automated arm 30, the image capture device 32, the controller 34 and the processor 36 comprise a vision system. The vision system may also comprise a feeder arrangement, such as the hopper 50. Optionally, the hopper 50 is controlled by the controller 34. Alternatively, the hopper 50 is independently controlled. Similarly, the vibratory mechanisms configured to vibrate the hopper and/or the light table may be integrated or may be separate.

Referring back to FIG. 2*a*, in this embodiment the automated arm 30 is configured to pick up an individual gemstone 90 from the base 65 of the light table 60 using the pick-up nozzle and to transport or transfer the individual gemstone 90 held on the pick-up nozzle to the moveable surface 20, and to place e.g. to release the gemstone 90 onto the moveable surface 20. The gemstone 90 is placed on the moveable surface 20 in a predetermined orientation, as previously discussed.

In general, for a cut gemstone, table-down (or culet-up) is the most stable orientation. The placement of a gemstone on the moveable surface in a table-down orientation therefore ensures that the gemstone does not subsequently move from its position on the moveable surface as it is transported to the measurement/dispensing locations. Said another way, once placed upon the moveable surface, the gemstone remains substantially stationary with respect to the movable surface and in the same orientation until it is dispensed from or transferred off the moveable surface. It is therefore unnecessary to carry out any re-orientation of the gemstone once it has been placed upon the moveable surface. It will be appreciated that transport of the gemstones to the measurement location does not commence until the gemstones are placed upon the moveable surface.

It will be appreciated that in alternative embodiments, not shown herein, the components of the above-described feeder arrangement are used in isolation. For example, the light table 60 can be used with an alternative hopper and/or an alternative automated arm, or an alternative device configured to transfer gemstones from the light table to the moveable surface. Similarly, the hopper 50 can be used with an alternative to the light table and/or the automated arm. The automated arm 30 can likewise be used with an alternative to the light table and/or alternative hopper, and so forth.

The moveable surface 20 is controlled in one embodiment by a controller (not shown) to move in predetermined, uniform increments e.g. to move intermittently. In one embodiment, the controller which controls the moveable surface 20 is the same controller as that which operates the transfer mechanism 30 and/or the light table and hopper; alternatively, the moveable surface 20 and the transfer mechanism 30 are controlled independently.

In the embodiment of FIG. 2*a*, the moveable surface is a rotatable disc 20, which is operated to move intermittently by a stepper motor (not shown). The rotatable disc 20 is controlled to rotate in uniform increments of around 9 degrees e.g. to move through an angle of 9 degrees during each rotation. That is, the rotatable disc 20 of this embodiment is configured to rotate through an angle of nine degrees and then come to a stop. In one embodiment, the duration of the stationary period of the moveable surface depends upon the availability of correctly oriented gemstones in the light table. For example, where one or more gemstones are appropriately oriented and available for pick-up and transfer, the moveable surface (e.g. the rotatable disc 20) is stationary for less than around 200 ms. In the case where no gemstones within the light table are correctly oriented, and vibration of the light table is required to provide correctly oriented stones for pick-up, the moveable surface can be stationary for up to a maximum of 3 seconds.

While the moveable surface 20 is stationary or halted, an individual gemstone 90 can be placed upon the moveable surface 20 by the automated arm 30, or alternative feeder arrangement component. Once a single gemstone 90 has been placed by the automated arm 30, the moveable surface 20 is controlled to move through another predetermined increment, and then stop. Another individual gemstone 90 can then be placed on the moveable surface 20 by the automated arm 30 and the moveable surface 20 is then controlled to move through another predetermined increment. This process can repeat until all of the gemstones present in the light box 60, or alternative feeder arrangement component, have been transferred onto the moveable surface 20. Similarly, this process can repeat until all of the gemstones present in the hopper 50, or alternative feeder arrangement component, have been transferred onto the moveable surface 20.

It will be appreciated from the above description that each gemstone 90 can be placed upon the moveable surface 20 at a predetermined distance from the previous gemstone 90. Said another way, the gemstones 90 placed upon the moveable surface 20 are substantially equidistant from one another.

Once placed upon the moveable surface 20, the gemstones are transported towards the one or more measurement locations 40*a*, 40*b* as the moveable surface 20 intermittently moves. As illustrated in FIG. 1, the moveable surface 20, and the one or more gemstones supported thereon, pass through the one or more measurement locations 40*a*, 40*b* as it moves incrementally. The speed of the moveable surface 20 during the period of motion may be constant, or may comprise periods of acceleration and/or deceleration, as will be described below.

In one embodiment, the moveable surface 20 is controlled so that the moveable surface 20 is stationary as or when each of the one or more gemstones arrives at the one or more measurement locations 40*a*, 40*b*. Where this is the case, measurements can therefore be obtained of individual gemstones that are stationary. However, in some embodiments, one or more measurements of individual gemstones are obtained while the gemstone on the moveable surface is in motion.

In one embodiment, in a time interval during which the moveable surface 20 is stationary, a first gemstone already present on one portion of the moveable surface 20 is measured at one of the one or more measurement locations, and at the same time, during the same time interval, a second, different gemstone is placed upon a second, different portion of the moveable surface 20, for example, by the automated arm 30. Additional gemstones may of course be present on the moveable surface between the first and second gemstones.

As a non-limiting example, in a first time interval during which the movable surface is stationary or not moving, a first gemstone is placed upon the moveable surface by the automated arm. The moveable surface then moves through a pre-defined distance or angle. In a second time interval during which the movable surface is stationary, or not moving, the first gemstone arrives at a first measurement location and a measurement of a property of the first gemstone is obtained. During this second time interval, a second gemstone is placed upon the moveable surface by the automated arm. The moveable surface then moves through a pre-defined distance or angle. In a third time interval during which the movable surface is stationary or not moving, the first gemstone arrives at a second measurement location and a measurement of a different property of the first gemstone is obtained. During this third time interval, the second gemstone arrives at the first measurement location and a measurement of a property of the second gemstone may be obtained. Additionally, during the third time interval, a third gemstone is placed upon the moveable surface by the automated arm.

The above non-limiting example further incorporates dispensing of the gemstones at the dispensing locations. For example, during a fourth time period during which the movable surface is stationary or not moving, the first gemstone arrives at a dispensing location and is dispensed or removed from the moveable surface; the second gemstone arrives at the second measurement location; the third gemstone arrives at the first measurement location; and a fourth gemstone is placed upon the moveable surface by the automated arm.

The placement, measurement and dispensing of gemstones which are stationary can be advantageous, particularly in the case of very small gemstones, as described above. However, as mentioned above, in some embodiments one or more measurements of individual gemstones are obtained while the gemstone is moving. In some embodiments, a first measurement of a gemstone is obtained while the gemstone is stationary and a second measurement of the same gemstone is obtained while the gemstone is moving. In one embodiment, a speed of the moveable surface during a time period in which the second measurement is obtained is lower than a speed of the moveable surface at other times. For example, the moveable surface may be accelerating to a maximum speed, or decelerating from a maximum speed at the time when the measurement of the gemstone is obtained.

Further detail of the hopper 50 will now be discussed with reference to FIGS. 3*a*, 3*b* and 4. As discussed above, in one embodiment the hopper 50 is configured to vibrate, periodically or continuously, so as to move or transport one or more gemstones from one end of the hopper 50 to the other end.

Figure 3A:
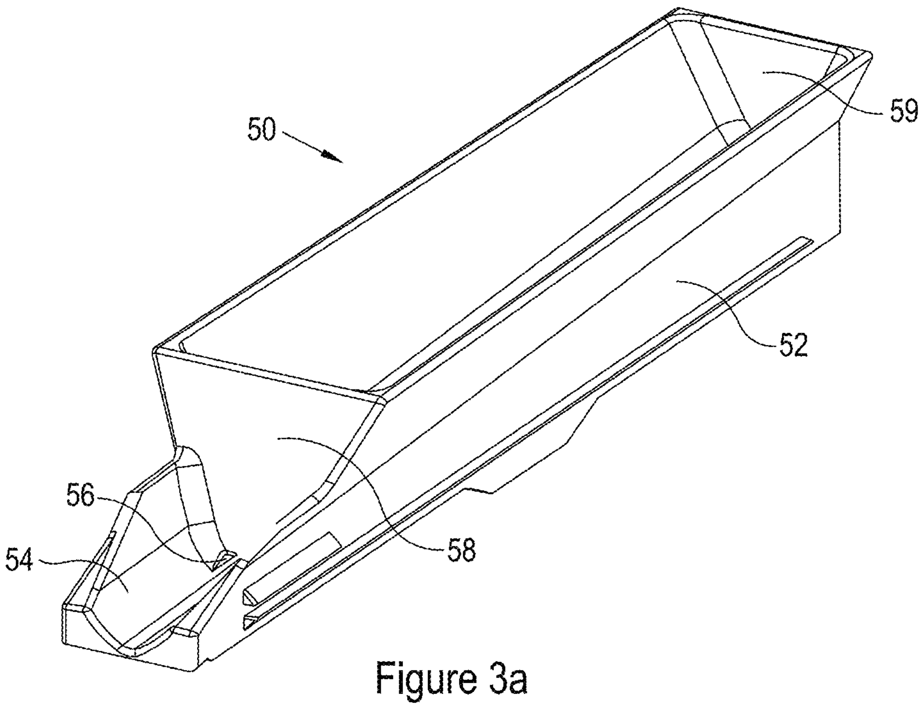
FIGS. 3*a*, 3*b* and 4 illustrate a hopper.
Figure 3B:
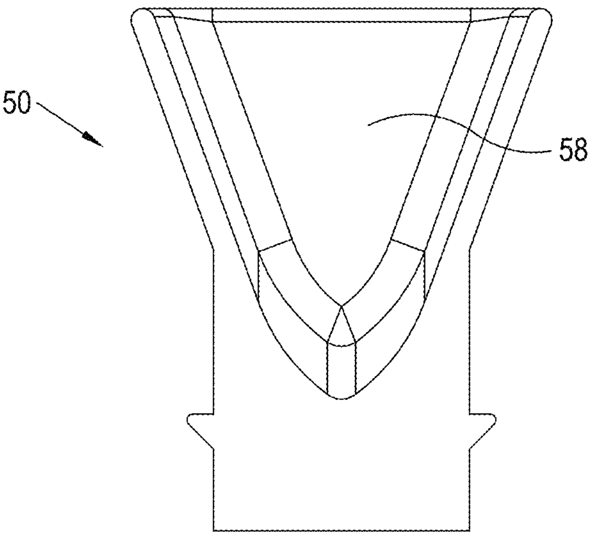
Figure 4:
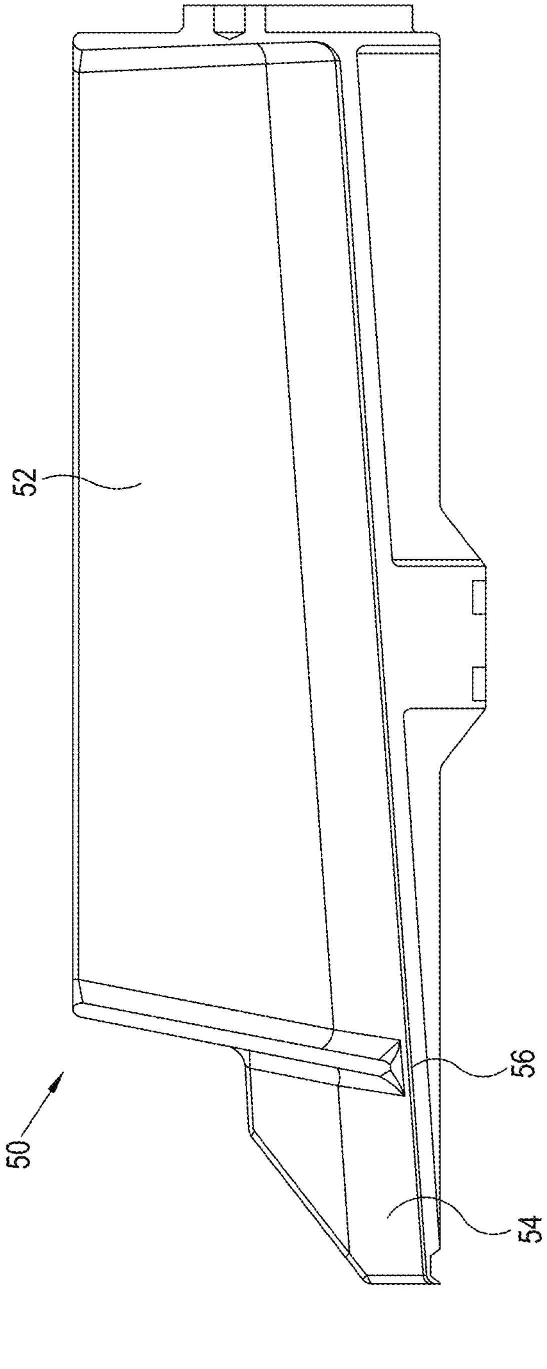

In the illustrated embodiment of FIGS. 3*a*, 3*b* and 4, the hopper 50 comprises a trough-like body 52, see FIG. 3*b*, terminated at each end by a substantially vertical, or slightly inwardly angled, end wall or plate 58, 59. In one example, one or both of the end walls 58, 59 is inwardly angled at around 75 degrees from horizontal. As best shown in FIG. 4, the hopper body 52 generally slopes from one end wall 59 to the other end wall 58. In one example, the hopper body 52 has an overall downwards slope from rear, adjacent the end wall 59 to front, adjacent the end wall 58 to of around 3 degrees from horizontal. The hopper body 52 is configured to receive a plurality of gemstones therein.

One end wall 58 defines a small aperture or porthole 56 at a base thereof. The end wall 58 and the aperture 56 together form a dam that restricts or controls the flow of gemstones leaving the feeder 50, for example, in a single vibration cycle. The diameter and/or shape of the aperture 56 can be configured specifically for the size of the gemstones to be sorted.

As best illustrated in FIG. 3*a*, once gemstones pass out of the hopper body 52 through the aperture 56 at the base of the end wall 58, the gemstones are received and directed by a spout 54, attached or integrally formed with the hopper body 52. In this embodiment, the spout 54 defines a channel in a base thereof which directs or controls the flow of gemstones such that the gemstones can be reasonably accurately dispensed from the hopper 50 to the next component e.g. the light table 60 (the collection area).

Advantageously, the body 52 and end walls 58, 59 of the hopper 50 are configured such that gemstones, and in particular, very small gemstones, are less likely to become stuck or lodged. In particular, the wall shape of the hopper body 52 avoids corners in which gemstones may lodge or clump. In some embodiments, the hopper body 52 and/or the end walls 58, 59 are not be flat, but instead are gently curved and convex in a transverse cross section. The shape therefore deviates from a V-shape in a transverse cross section, because the walls are curved and a sharp corner is avoided where the side walls meet. A sharp corner may cause stones to get stuck. Again, this curvature reduces the risk of gemstones sticking to the inner surfaces of the hopper body 52, 58, 59, since the contact area between the gemstones and the inner surfaces of the hopper body 52, 58, 59 is reduced.

This is a particular problem where very small cut stones, e.g. 0.1 to 0.3 point stones, are being sorted, because the gravitational force on such stones may be less than forces causing sticking. The flat gemstone facets may "stick" to any flat surface, and are so small that any flat internal surface of the hopper can be a potential sticking point. A curved surface instead of a flat surface therefore reduces this issue. Sticking, whether a result of grease or electrostatic charge on the stones, can lead to incomplete sorting of a parcel of gemstones, resulting in inefficient processing of the parcel, or even in stones being lost. Sticking may further be reduced by improving stone cleanliness and utilising humidity (static) control.

Figure 7:
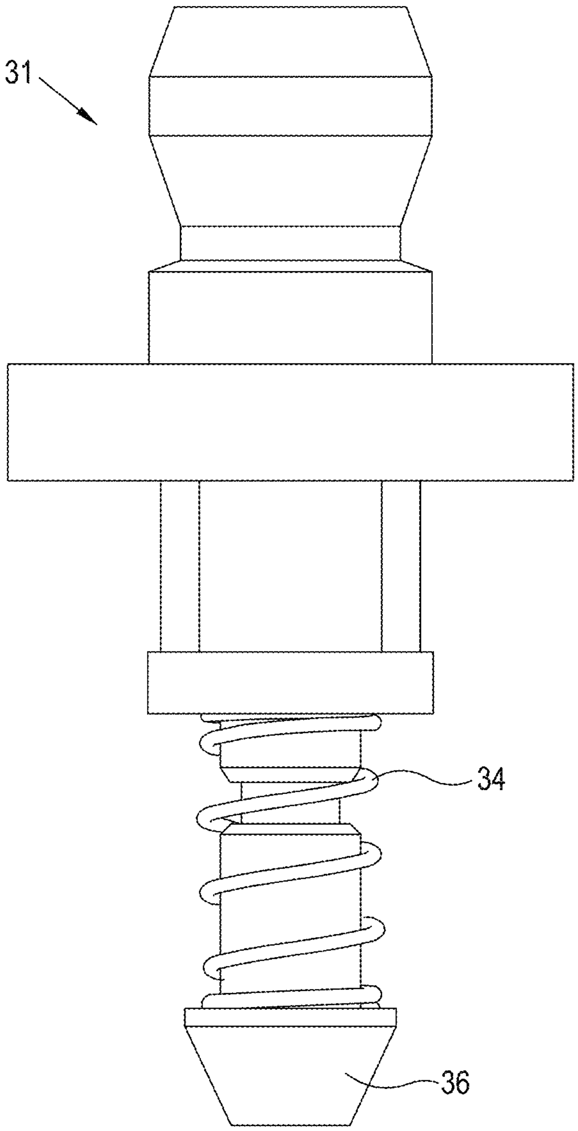

Further details of the pick-up nozzle 31 of the robotic arm 30 will now be discussed with reference to FIGS. 5, 6*a*, 6*b*, 6*c* and 7. In this illustrated embodiment, FIGS. 5, 6*a*, 6*b* and 6*c* are cross-sectional views, and FIG. 7 is a perspective view of the pick-up nozzle 31 of the automated arm 30.

In this embodiment, the pick-up nozzle 31 comprises an elongate nozzle body 32, defining a central bore 33 terminating at a lower end of the nozzle in a receiving aperture 38; an annular outer collar substantially surrounding the body 32; and a coil spring 34, or other suitable biasing component surrounding the annular collar. In this embodiment, the outer collar comprises upper 36*a* and lower 36*b* portions. The lower portion 36*b* of the outer collar terminates in a tapered end 36*c* having a substantially flat end wall 36*d* that extends in a plane generally perpendicular to a longitudinal axis of the nozzle. The nozzle body 32 and collar portions 36*a*, 36*b* are generally tubular in form, although they comprise various additional structural features such as a tapered end to enable corresponding functions as described further below.

In this non-limiting example, the upper collar portion 36*a* is rigidly connected to the nozzle body 32, such that the upper collar portion 36*a* and the nozzle body 32 move together. In contrast, the lower collar portion 36*b*, including the tapered end 36*c*, is configured to be slideably (or telescopically) moveable with respect to the nozzle body 32 in a longitudinal direction, which is a direction of the main longitudinal axis of the nozzle body. Thus, the nozzle 31 is configured to move between a retracted position of the body and an extended position of the body, as will be described in more detail below. In other embodiments not shown here, the upper collar portion 36*a* is configured to be slideably moveable with respect to the nozzle body 32.

The pick-up nozzle 31 can be connected, inserted or otherwise attached to one end of the automated arm 30. The central bore 33 of the pick-up nozzle 31 can be selectively connected to a vacuum supply e.g. a vacuum, or underpressure, generator (not shown), or pressure source, such that a gemstone 90 can be held by negative pressure on the receiving aperture 38 of the pick-up nozzle 31. The negative pressure is lower than the surrounding atmospheric pressure.

Figure 5:
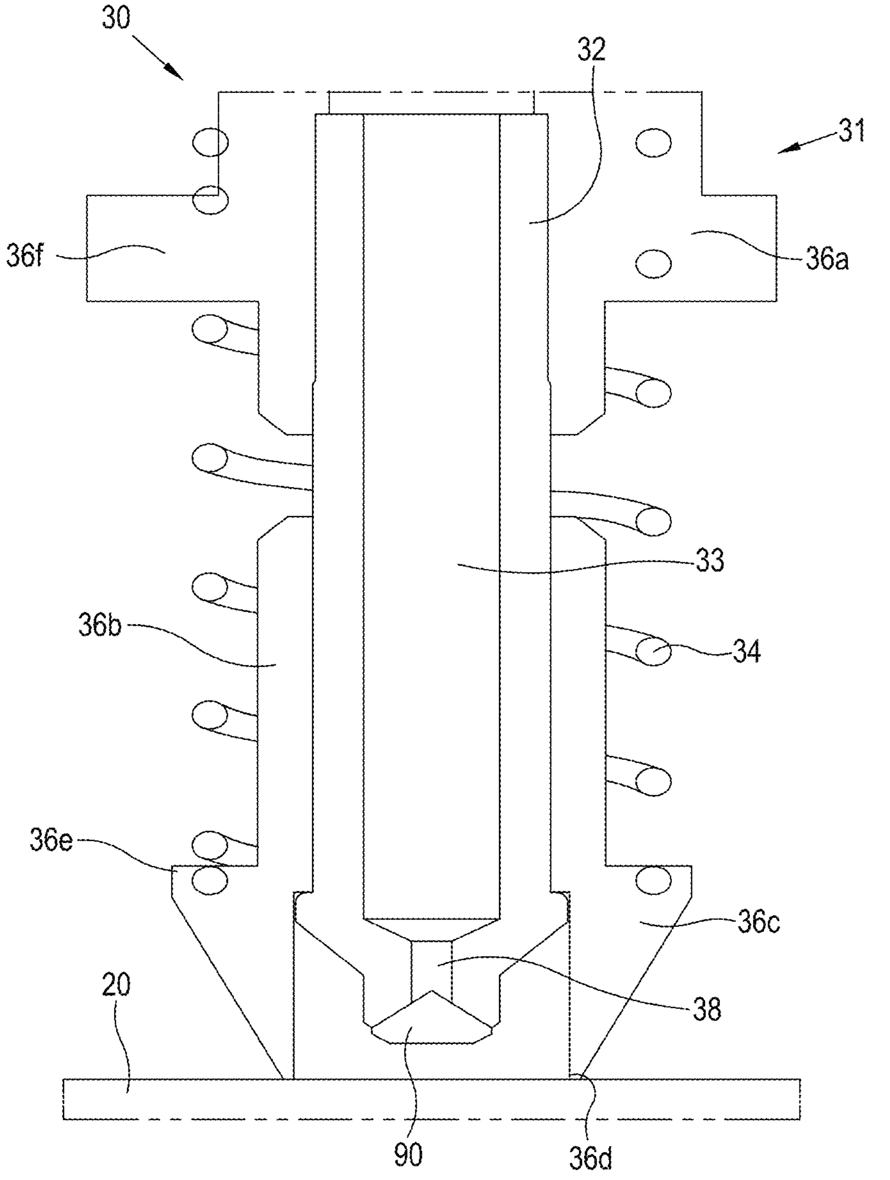

In one embodiment, the receiving aperture 38 defines a chamfer or angled outwardly facing surface (a v-shaped surface, as shown in FIG. 5) which is configured to align with or substantially correspond to the culet angle of a cut and polished gemstone. The matching shape creates a sealing connection and avoids or reduces a leak path for air, thereby improving the holding force of the nozzle.

Referring back to FIG. 5, the tapered end 36*c* of the lower collar portion 36*b* defines a protruding shoulder 36*e*, distal to the flat end wall 36*d*. The shoulder 36*e* provides a flat, annular surface upon which one end of the biasing component—in this example, a coil spring 34—can be connected or affixed. The other end of the biasing component 34 is attached or affixed to a shoulder 36*f* defined by the upper collar portion 36*a*. In the retracted position, the spring 34 holds the upper 36*a* and lower collar 36*b* portions at a distance from one another, as shown in FIG. 5. The nozzle body 32 is received within the upper collar portion 36*a*.

In the retracted position of the nozzle 31, the lower portion 36*b* of the outer annular collar, and in particular the tapered end 36*c*, which tapers inwardly from the shoulder 36*e*, is configured to extend vertically below or beyond the aperture 38, such that the aperture 38 is substantially surrounded by the collar lower portion 36*b* and the tapered end 36*c* in a radial direction. Thus, any gemstone 90 held on the nozzle aperture 38 via negative pressure or vacuum applied to the aperture 38 via the bore 33 is also substantially surrounded by the tapered end 36*c*. Said another way, the flat end wall 36*d* of the tapered end 36*c* extends longitudinally beyond the aperture 38 in the retracted position.

An example of the use of the nozzle 31 to dispense a gemstone 90 held thereon will now be described with reference to FIGS. 6*a* and 6*b*. In particular, movement of the nozzle 31 between the retracted position described above, and an extended position, will be described.

In a first actuation step, carried out by the controller (not shown), the lower end of the nozzle 31, the tapered end 36*c*, is brought into contact with or rests upon a dispensing surface, such as the moveable surface 20 (not shown here for clarity). In some embodiments, the flat end wall 36*d* of the tapered end 36*c* is configured for contact with the dispensing surface. In some examples, the flat end wall 36*d* is configured to minimise the nozzle footprint when picking up and/or dispensing gemstones. It will be appreciated that, in the retracted position of the nozzle 31, the gemstone 90 held on the nozzle aperture 38 does not contact the surface (not shown here for clarity), but is held some distance above the surface. In one example, a distance between a lowest point of the gemstone and the surface is around 0.5 mm. In this example, a longitudinal distance between the flat end wall 36*d* and a lowermost point of the aperture 38 is defined as distance D1, a first distance, as illustrated in FIG. 6*a*. Since the flat end wall 36*d* of the tapered end 36*c* is in contact with the dispensing surface, a distance between the lowest point of the aperture 38 and the surface is also substantially D1.

In the retracted position illustrated in FIG. 6*a*, the gemstone 90 held on the aperture 38 is therefore enclosed in a space or volume formed by the annular walls of the tapered end 36*c* and the dispensing surface, with which the flat end wall 36*d* of the tapered end 36*c* is in contact.

The tapered end 36*c* and/or the flat end wall 36*d* preferably does not form a seal with the surface, however. Air can flow between an interior and an exterior of the lower collar portion 36*b*. The provision of a pressure differential between the interior and exterior of the lower collar portion 36*b* can be provided by a leakage path between the nozzle body 32 and the collar, and/or can be the result of an aperture provided in the lower collar portion 36*b*.

As illustrated in FIG. 6*a*, in the retracted position of the nozzle 31 the flat end wall 36*d* of the tapered end 36*c* of the lower collar portion 36*b* is in contact with a dispensing surface, following the first actuation step. The uncompressed coil spring 34, which is located between the upper 36*a* and lower shoulders 36*b*, maintains a vertical gap or space between the upper 36*a* and lower 36*b* collar portions. Thus, the tapered end 36*c* extends beyond the nozzle aperture 38.

As illustrated in FIG. 6*b*, the nozzle 31 is then actuated or controlled by the controller to move further towards the surface (not shown here for clarity), extending in the direction indicated by arrow A, in a second actuation step. This downward motion exerts a longitudinal force on the coil spring 34 via the upper shoulder 36*f*, causing the spring 34 to compress and closing or reducing the gap between the upper 36*a* and lower 36*b* collar portions. Since the lower collar portion 36*b* is already in contact with the surface (not shown), the upper collar portion 36*a* substantially moves, together with the nozzle body 32, towards the lower collar portion 36*b* in direction A. Said another way, the lower collar portion 36*b* and tapered end 36*c* thereof slides over the nozzle body 32, including the aperture 38, in direction B as the nozzle body 32 moves in direction A, extending towards the surface.

As shown in FIG. 6*b*, the nozzle aperture 38 and gemstone 90 held thereon move further towards the dispensing surface (not shown for clarity). In other words, the nozzle 31 moves from the retracted position to the extended position. In this specific context, "retracted" and "extended" refer to the longitudinal position of the nozzle body 32 with respect to the lower portion of the outer collar 32*b*. As discussed above, in the retracted position, a distance D1 can exist between the lowest point of the aperture 38 and the flat end wall 36*d* of the tapered end 36*c*. After the nozzle 31 has been moved into the extended position, this distance decreases to a second distance D2, as shown in FIG. 6*c*, where D2<D1. The term "retracted" can also refer to an uncompressed position of the nozzle and the term "extended" can refer to a compressed position of the nozzle.

The gemstone 90 is still not brought into direct contact with the surface while it is held on the pick-up nozzle, however. In this non-limiting example, a vertical gap G remains between the gemstone and the surface, as illustrated in FIG. 6*c*. Maintaining a gap G between the gemstone and the surface may prevent the gemstone sticking to the nozzle aperture 38 during the dispensing operation. The extent of this gap G will of course depend upon the size of the gemstone held on the nozzle aperture, typically the smaller the gemstone, the larger the gap, and the extent of the engagement of the gemstone with the nozzle aperture. As discussed above, small gemstones can become electrostatically charged during handling/processing, which can lead to the gemstones becoming prone to unpredictable behaviour and/or "sticking" to surfaces.

In some examples, distance D2 and gap G are substantially the same, depending upon the size of the gemstone and the configuration of the aperture walls.

In one embodiment, gap G is maintained by the provision of a stop within an interior of the upper or lower collar portions. Alternatively or additionally, gap G is maintained and determined by a threaded member (not shown) which allows the longitudinal space between the upper and lower collar portions to be adjusted, or by abutment of the upper collar portion and the lower collar portion as the biasing member is compressed. In some examples, the gap G is maintained at around 0.25 mm by the upper surface of the lower collar portion and the lower surface of the upper collar portion.

Referring now to FIGS. 6*b* and 6*c*, following the second actuation step the gemstone 90 is held by the nozzle aperture 38, within the aperture walls, slightly above the surface 20 and within an interior of the tapered end 36*c* of the collar lower portion 36*b*. The flat end wall 36*d* of the tapered end 36*c* of the collar is held firmly against the surface 20, such that the gemstone 90 cannot pass therebetween. The gemstone 90 can now be removed from the pick-up nozzle 31, for example, by using positive pressure to blow the gemstone 90 off the receiving aperture 38 and onto the surface 20 below. Positive pressure in the form of a "puff" of air can be supplied via the central bore of the nozzle 31. The positive pressure is higher than the surrounding atmospheric pressure The final location of the dispensed gemstone upon the dispensing surface 20 is therefore controlled or constrained by an internal diameter of the flat end wall 36*d* of the tapered end 36*c* of the collar. In one embodiment, the internal diameter (or maximum dimension where the collar is not annular) of the end wall 36*d* is around 2 mm. The gemstone 90 can be dispensed, by falling off or being blown off the nozzle 31 by a "puff" of air, applied by a positive pressure, but any lateral movement of the gemstone upon the surface 20 is constrained to be within an area of the surface 20 corresponding to the inner diameter (or maximum dimension) of the end wall 36*d*. This will be the case even where the gemstone bounces or otherwise moves before settling, following first contact with the surface 20. However, in some embodiments, gap G is configured such that the gemstone 90 remains in the orientation in which it was held by the nozzle 31, after coming to rest upon the dispensing surface 20. Precise placement of the gemstone 90 onto the moveable (dispensing) surface 20 is thereby enabled, even where the gemstone 90 may be electrostatically charged, as discussed above.

After the gemstone 90 has been dispensed from off the nozzle 31, the nozzle 31 is actuated or controlled by the controller (not shown) in a third actuation step, to move away from the surface 20, leaving the gemstone 90 behind. As the downward force on the nozzle body 32 is removed, the nozzle 31 moves from the extended position back to the retracted position as the coil spring 34 expands to uncompressed position. The upper portion 36*a* of the collar moves away from the lower portion 36*b*, and the nozzle body 32 retracts by sliding longitudinally with respect to the tapered end 36*c* such that the tapered end 36*c* once again extends beyond the nozzle aperture 38.

It will be appreciated that although the above describes dispensing of a gemstone already held on the nozzle, similar steps apply when picking a gemstone up. A difference between pick-up and placement (dispensing) is that at the point of pick-up, a reduced pressure is provided through the nozzle, such that the gemstone is attached and remains attached to the nozzle. When placing the gemstone, the nozzle is sent to its placement location and once there, a split second of positive air pressure is applied to the nozzle to 'blow' the gemstone off the nozzle and onto the movable surface. In this respect, the lower collar prevents the positive air pressure from causing the gemstone to move too far from its intended location on the movable surface. The positive air pressure is stopped or cut off before the nozzle is retracted to avoid the gemstone being blown beyond the inner circumference of the tapered end.

In one example, a total time period between picking up a first gemstone with the nozzle, dispensing this gemstone onto the movable surface and returning to the collection location (light table) to pick up a second gemstone is around 1 second. A total time period between picking up a first gemstone and dispensing (placing) that first gemstone onto the movable surface is around 0.5 seconds.

In one embodiment, the nozzle body 31 is provided with a protrusion 36*g*, which is configured to cooperate with a corresponding recess 36*h* on an interior of the tapered end 36*c*. The protrusion 36*g* and recess 36*h* cooperate to prevent the nozzle body 32 from retracting too far within the collar lower portion 36*b*. Cooperation of the protrusion 36*g* and recess 36*h* are illustrated in the cross-section shown by FIG. 6*c*.

In one embodiment, alternative biasing components are provided in place of or in addition to the coil spring. For example, a resiliently deformable material can be used.

In certain embodiments, a nozzle for picking up and dispensing a gemstone comprises: a body defining a central bore and terminating in an aperture configured to receive the gemstone; a collar substantially surrounding the body, wherein the body is moveable between a retracted position and an extended position with respect to at least a portion of the collar; wherein, in the retracted position, the collar extends beyond the aperture by a first distance in the direction of a main longitudinal axis of the body; and in the extended position, the collar extends beyond the aperture by a second distance in the direction of the main longitudinal axis of the body; wherein the first distance is greater than the second distance.

The body may be telescopically connected to the collar. The nozzle may be configured to pick up and dispense a gemstone having a maximum dimension of 1 mm, preferably between 0.5 mm and 1 mm. The central bore may be configured to be connected to a pressure source in use. The pressure source may be configured to apply a negative or positive pressure to the aperture. The nozzle may be biased into the retracted position by a biasing element, wherein the biasing element is one of: a spring, a coil spring, a resiliently deformable material. The body and the collar may be substantially annular. The collar may comprise an upper collar portion and a lower collar portion. The upper collar portion and the lower collar portion may be longitudinally separated by a coil spring. The upper collar portion may be configured to move together with the nozzle body and the lower collar portion may be configured to be moveable with respect to the nozzle body. The lower collar portion may terminate in a tapered end. The lower collar portion may terminate in a substantially flat end wall. The aperture may define an outwardly facing surface or set of surfaces adapted to receive the gemstone. The gemstones may be cut gemstones. The surface defined by the aperture may have a substantially v-shaped cross section, and, optionally, an angle of the v-shaped cross section may match the angle between outer surfaces of the cut gemstones. The nozzle may be attached to an automated arm. The automated arm and/or the nozzle attached thereto may be actuated by a controller.

In certain embodiments, a method of dispensing gemstones comprises providing a nozzle comprising a nozzle body, the body defining a central bore therethrough and terminating in an aperture, the body substantially surrounded by a collar and slideably moveable between a retracted position and an extended position with respect to at least a portion of the collar; wherein in the retracted position, the collar extends beyond the aperture by a first distance; and in the extended position, the collar extends beyond the aperture by a second distance; wherein the first distance is greater than the second distance, and wherein the aperture is surrounded by the collar in both the retracted and the extended positions; receiving a gemstone to be dispensed on the aperture; applying a negative pressure to the bore, thereby holding the gemstone on the aperture; with the nozzle in the retracted position, bringing the collar into contact with a surface onto which the gemstone is to be dispensed; actuating the nozzle into the extended position; applying positive pressure to the aperture to dispense the gemstone onto the surface; and actuating the nozzle into the retracted position.

The method may comprise connecting the central bore to a pressure source to apply the negative or positive pressure to the aperture. The method may comprise one or more of: biasing the nozzle into the retracted position; moving an upper collar portion together with the nozzle body and moving the lower collar portion with respect to the nozzle body; controlling a final location of the gemstone upon the surface by an internal diameter of a tapered end of the collar; bringing the collar into contact with a surface onto which the gemstone is to be dispensed with the nozzle in the retracted position, and actuating the nozzle into the extended position, while maintaining a vertical gap between the gemstone and the surface; orienting the gemstone prior to receiving the gemstone on the aperture and maintaining the gemstone in the same orientation while dispensing the gemstone onto the surface; attaching the nozzle to an actuating mechanism and controlling the actuating mechanism to move the nozzle from a collection location at which the gemstone is received to a dispensing location at which the gemstone is dispensed onto the surface; surrounding the gemstone with the collar while applying the positive pressure. Applying positive pressure to the aperture to dispense the gemstone onto the surface may comprise stopping applying the positive pressure prior to actuating the nozzle into the retracted position.

In the embodiments illustrated by FIGS. 5, 6 and 7, as described above, an individual gemstone can be precisely placed (for example, within 2 mm) in a correctly oriented (e.g. table-down orientation) onto an upper surface of the moveable surface. As discussed above, the moveable surface 20 is stationary during placement of the stone, but once the stone has been placed the moveable surface 20 begins to move again.

In one embodiment, any wear caused by repeated contact between the moveable surface and the pick-up nozzle collar is reduced or eliminated by incrementing the moveable surface a very small amount prior to the start of each gemstone screening run.

Once positioned upon the moveable surface by the automated arm, the gemstone remains in that position as it is transported by the moveable surface to the one or more measurement locations. Said another way, the gemstone does not change its position or orientation between being placed upon the moveable surface by the automated arm and being dispensed at the one or more dispensing locations. This is the case even where the moveable surface moves intermittently between placement and dispensing.

Referring back to the embodiment of FIG. 1, the apparatus comprises first and second measurement locations 40*a*, 40*b*. In one embodiment, the first measurement location comprises a luminescence measurement cell, and the second measurement location comprises a photoluminescence (PL) measurement cell. It will be appreciated that in other embodiments, further measurements can be obtained at the one or more measurement locations. Similarly, only one measurement location can be provided and one or more measurements of a stone can be obtained at the one measurement location. Alternatively, the same measurement can be obtained at both the first and second measurement locations, so the measurement may be repeated. It will be appreciated that in other examples, the first measurement location comprise a PL measurement cell and the second measurement location comprises a luminescence measurement cell. Alternative/additional measurement cells may be envisaged.

Measurements of gemstones can be obtained by illuminating the gemstone, for example with ultraviolet light or other radiation to obtain luminescence from the stone. The light can be provided by a laser, LED, or other excitation source and the light emitted by the gemstone is detected by a detector known to the skilled person to obtain a photoluminescence (PL) spectrum. While it may be desirable to increase illumination spot size and/or detection area, to ensure that a gemstone is fully and/or correctly illuminated during measurement, this increase in spot size and/or detection area can reduce the sensitivity of the measurement by increasing signal to noise ratio because the area surrounding the stone will cause noise by scattering of light without adding signal. Accordingly, in one embodiment, an illumination arrangement is provided at one or both of the measurement locations, in which a conventional angle of incidence of (for example) the PL illumination laser is decreased, and made shallower. It will be appreciated that a shallower illumination angle is not restricted to PL measurements but can be used for other measurements of the gemstone.

Figure 8A:
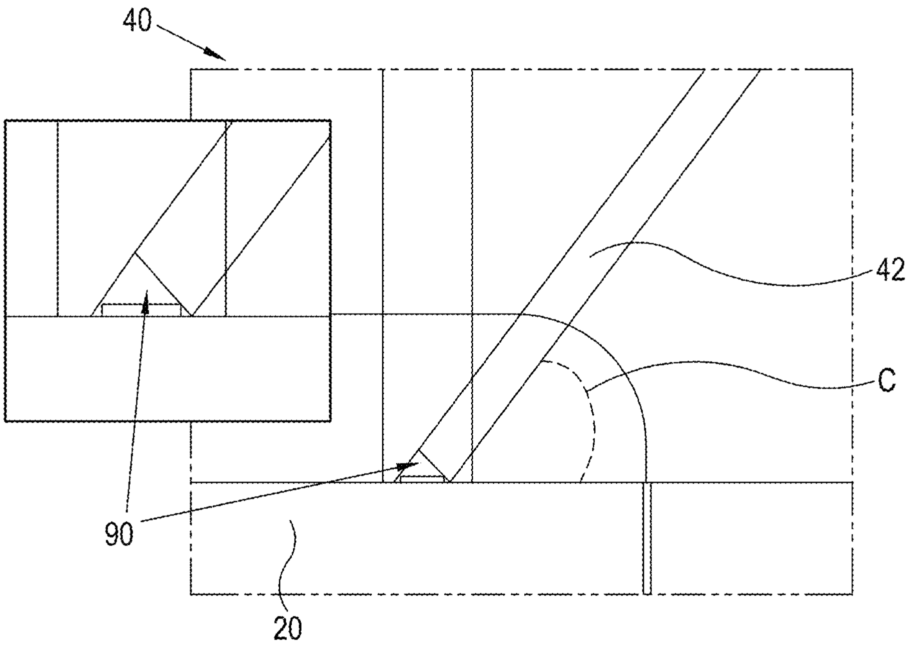
FIGS. 8*a* and 8*b* illustrate optical arrangements.
Figure 8B:
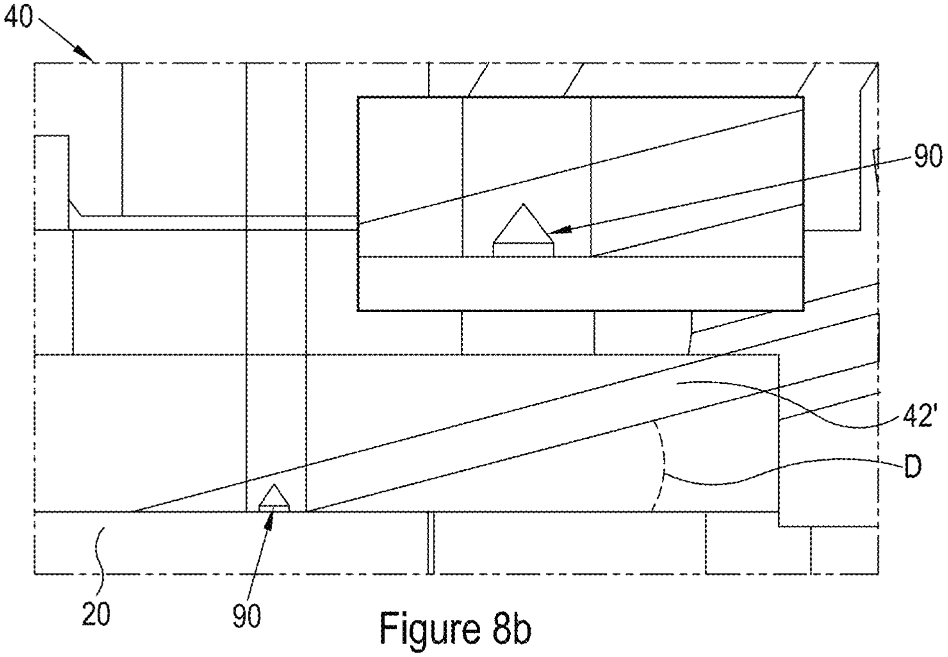

A modified, shallow illumination arrangement is illustrated in FIG. 8*b*, with a conventional illumination arrangement shown in FIG. 8*a* for comparison. In FIG. 8*a*, the gemstone 90 supported on the moveable surface 20 at the measurement location 40 is illuminated by a beam 42 with a predetermined incidence angle C. In one embodiment, angle C may be around 49 degrees off the horizontal. As shown in the enlarged portion of FIG. 8*a*, the illumination spot size is therefore relatively small, requiring highly accurate placement of the gemstone on the moveable surface to ensure full and/or correct illumination and collection, the collection optics being perpendicular to the moveable surface. Failure to place the gemstone such that it is located within the illumination spot upon the moveable surface can result in inaccurate measurement results. This is a particular problem with very small melee stones, e.g. 0.1 to 0.3 point stones, which can easily be missed by the illumination beam. Where a particular gemstone is not fully illuminated by the beam, a measurement of the gemstone's properties may be inaccurate or unobtainable.

In FIG. 8*b*, the modified illumination arrangement has a decreased predetermined incidence angle of D, where C>D. In one embodiment, angle D is around 10 degrees off the horizontal plane defined by the moveable surface. As shown in the enlarged portion of FIG. 8*b*, the illumination spot size of the beam 42' is therefore larger compared with that of FIG. 8*a*. Hence, a shallower incidence angle results in a reduced sensitivity to the radial position of the gemstone on the moveable surface. Moreover, the intensity of the illumination beam incident on the gemstone is not significantly reduced, unlike the intensity of a beam expanded by a conventional beam expander to achieve the same illuminated area on the horizontal plane without altering the angle of incidence.

The radial position of a gemstone on the moveable surface, measured, for example, as a distance between the stone and the centre of the moveable surface, can be controlled by an internal diameter of the pick-up nozzle collar on the automated arm, as discussed above. However, the circumferential position, e.g. a distance along the moveable surface, may also need to be controlled in order to ensure correct illumination at the one or more measurement locations. Again, this is a particular problem with very small melee stones, e.g. 0.1 to 0.3 point stones.

In one embodiment, a reduction in sensitivity to the circumferential position of the gemstone is achieved by moving the gemstone slowly through the detection area at the one or more measurement locations, before accelerating the moveable surface to normal speed during the next increment of the moveable surface. In other words, the moveable surface can be operated at least at a first speed and at a second, lower speed. In this way, even where a gemstone is not initially circumferentially located within the illumination spot as it approaches the measurement location, the gemstone can subsequently pass through the illumination spot as it moves slowly through the measurement location, the radial location of the stone having been controlled by the pick-up nozzle as discussed above. The effect of this reduced speed on the overall speed and/or throughput of the apparatus is negligible.

Using the example methods discussed above, which may be applied at one or both of the measurement locations, a desired measurement sensitivity can be retained, whilst allowing a reasonable tolerance to gemstone position. This in turn enables practicable commissioning and operational tolerances to be employed in the automated arm (robot) setup.

Referring back to the embodiment of FIG. 1, at the first measurement location 40*a* the luminescence measurement cell comprises a source of electromagnetic radiation at wavelengths of substantially 225 nanometres (nm) or less (provided by an ultraviolet or UV lamp, laser, or other light source) for exciting a gemstone, and a light detection device or camera for capturing any visible light emitted by the gemstone upon excitation by the electromagnetic radiation. The operation of the UV lamp and the camera is synchronised by a controller, taking into account any offset value applicable to the camera. The camera can capture light emitted by a gemstone during excitation, for example, fluorescence. The camera can be also be selectively configured by the controller with a delay, so that the camera is able to capture light during a time window which begins after excitation has ended. Thus, the camera can capture phosphorescence as well as fluorescence.

Fluorescence is generally only emitted during ultraviolet excitation of the gemstone. Any fluorescence produced during excitation will decay very rapidly once the excitation is terminated. Phosphorescence on the other hand is a type of luminescence that remains once the excitation is removed, but subsequently decays away over a longer timescale. Phosphorescence can persist for some time after the excitation is terminated, or can decay within milliseconds of the end of the excitation pulse. The process of delaying capture of visible light until the excitation pulse has ended and any fluorescence has decayed ensures that the fluorescence is "gated out" and does not obscure any phosphorescence emitted after the end of the excitation pulse. The end of the time window for capturing visible light emitted by a gemstone may also be carefully selected to choose the decay time of the fluorescence and/or phosphorescence captured. In this way, the apparatus can capture visible light emissions which might otherwise be missed.

Other methods for improving the signal to noise ration may be included, such as lock-in amplifiers, or various optical filters.

In the embodiment of FIG. 1, at the first measurement location 40*a* a gemstone is irradiated with multiple excitation pulses of electromagnetic radiation, and during and/or following each excitation pulse, light emitted by the gemstone in at least one time window having a predetermined time relationship relative to the excitation pulse is detected, so as to obtain luminescence data. The or each time window can be chosen to include luminescence having a decay time characteristic of one or more of "markers", characterised by specific luminescence wavelengths and decay times. The decay time may be defined as the time taken for the number of excited molecules to decay to 1/e or 36.8%. The luminescence data associated with all of the pulses can be combined and then analysed at a processor (not shown) in order to establish the presence or absence of one or more of the markers.

Non-limiting examples of specific markers which may be used in the identification of a gemstone at the first measurement location 40*a* are illustrated in Table 1.

TABLE 1

| Marker | Wavelength | Decay time | Time window | Indication |
|---|---|---|---|---|
| blue fast phosphorescence marker | about 450 nm | About 80 ms after pulse end | opens at or after pulse end, closes about 80 ms after pulse end | Natural type IIa or la diamond |
| turquoise slow phosphorescence marker | about 480 nm | greater than 80 milliseconds | opens about 80 ms after pulse end, closes about 500 ms after pulse end | Natural type lib diamond |
| green slow phosphorescence marker | between about 530 nm and about 550 nm | greater than 80 milliseconds | opens about 80 ms after pulse end, closes about 500 ms after pulse end | Refer for further testing |
| orange long lived fluorescence marker | between about 535 nm and about 600 nm | less than 1 millisecond | Closes at or before pulse end | Refer for further testing |
| red phosphorescence marker | between about 575 nm and about 690 nm | greater than 1 millisecond | | Refer for further testing |
| weak green fluorescence marker | about 510nm | | Closes at or before pulse end | Refer for further testing |

In the embodiment of FIG. 1, a gemstone at the second measurement location 40*b* undergoes laser excitation at around 450 nm with a 3 mm diameter beam at an angle of around 10° from the horizontal. Detection of PL is carried out using a miniature spectrometer over a 3 mm diameter measurement area using a single lens system at 0° from the vertical.

Once a PL spectrum of the gemstone at the second measurement location 40*b* has been acquired it is transmitted to a controller and analysed, for example, using a suitable algorithm. A determination regarding the gemstone under test may be produced, and the gemstone identified, based upon the presence of a Raman line and/or detection of Ni related PL features.

The presence in the spectrum of a sharp, single Raman line centred at around 1332 $cm^{-1}$ is an indicator that the gemstone under test contains diamond material and therefore is not a simulant, so the measurement will indicate that the gemstone is not composed of a substance other than diamond, such as cubic zirconia. The presence in the spectrum of Ni related PL features at around 787 nm in the absence of a stronger 793 nm feature is an indicator that the gemstone under test is a natural diamond and not a synthetic diamond. Therefore, the presence of both a sharp, single Raman line at around 1332 $cm^{-1}$ and Ni related PL features at 787 nm but not 793 nm is an indicator that the gemstone under test is a natural diamond. In contrast, the absence of a Raman line at around 1332 $cm^{-1}$ is an indicator that the gemstone under test is not a diamond.

The determination as to whether the gemstone at the second measurement location 40*b* is natural or not may be made based upon the results for that gemstone received from both the first and second measurement locations 40*a*, 40*b*. Therefore, the determination may not be made until a gemstone has passed through both measurement locations 40*a*, 40*b*. It will be appreciated that where a determination is made at the first measurement location that a particular stone should be referred for further testing, the measurement obtained at the second measurement location may provide that further testing. The number of gemstones in a parcel which require further testing and/or analysis using a separate apparatus can therefore be reduced.

Once a gemstone has passed through the one or more measurement locations, it is dispensed or removed from the moveable surface at one of the one or more dispensing locations. In one embodiment, dispensing is carried out in accordance with the measurement(s) obtained at the one or more measurement locations. One or more processors at the one or more measurement locations signals a controller to activate an appropriate dispensing mechanism at the one or more dispensing locations, based upon the analysis of the measurement(s) carried out by the processor(s).

Figure 9:
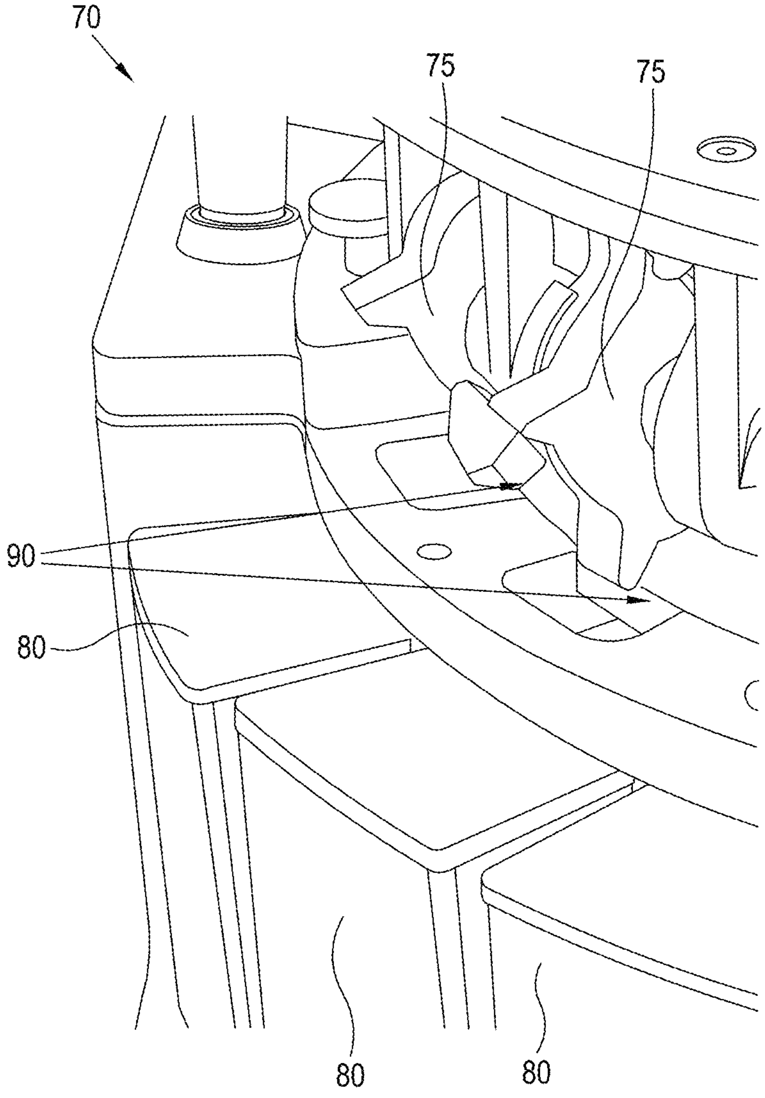
FIG. 9 illustrates a dispensing mechanism and dispensing location.
Figure 10:
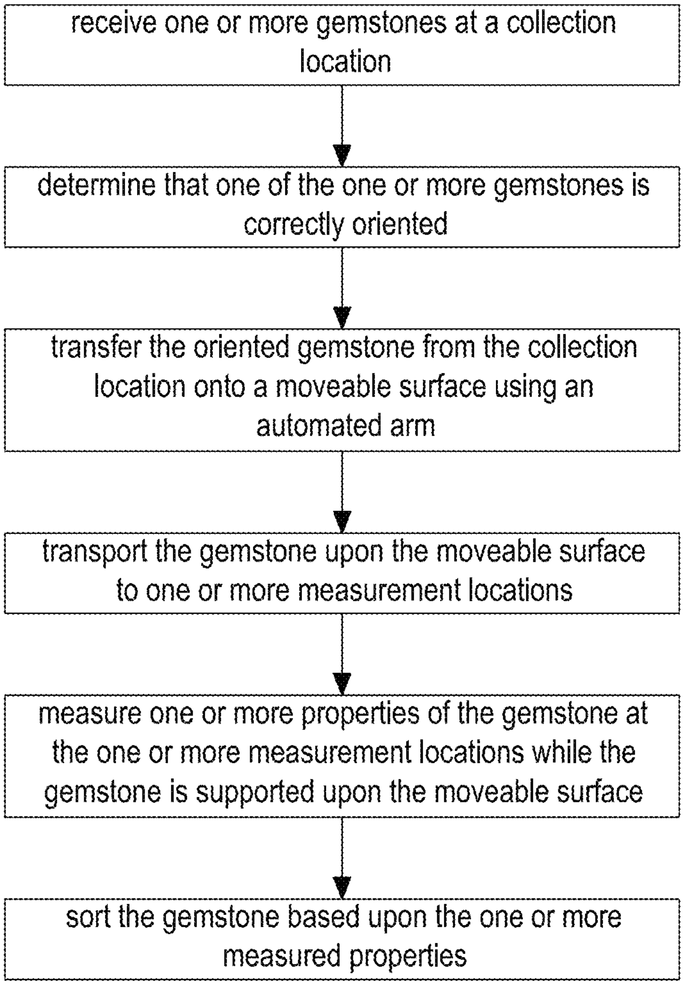
FIG. 10 is a flow diagram of a method of sorting gemstones.

FIG. 9 illustrates an embodiment in which each dispensing location 70 includes a dispensing mechanism in the form of a rotating wheel 75, and a dispensing bin or container 80. In this embodiment, the wheel 75, which may for example comprise a closed cell foam material, is arranged to rotate about a horizontal axis located above the moveable surface 20. The wheel 75 comprises one or more (e.g. 5) teeth disposed around an outer circumference. Each tooth comprises a leading portion and a trailing portion, the leading portion extending further from a centre of the wheel 75 than the trailing portion.

In this illustrated embodiment, a motor (not shown) is configured to rotate the wheel 75 and a sensor (which may be a light curtain, not shown) is configured to identify when one of the teeth is located at a predetermined (e.g. home) position. The wheel 75 is arranged so that a gap is defined between the moveable surface 20 and the wheel 75 when the wheel 75 is in the home position. As the wheel 75 rotates away from the home position, one of the teeth comes into contact with a gemstone to be dispensed, and pushes the gemstone off the moveable surface and into a predetermined dispensing bin 80. The wheel may further be arranged so that one of the teeth comes into contact with the horizontal moveable surface 20 as the wheel rotates away from the home position, and pushes the gemstone off the moveable surface 20.

The above-described wheel can be particularly suitable for very small gemstones, as described above, as each gemstone can be gently swept from the moveable surface rather than being "flicked". For very small stones, e.g. 0.1 to 0.3 point stones, this may be particularly advantageous in view of the electrostatic charge which can be induced on such small stones and their tendency to behave unpredictably.

In one non-limiting example, there are five dispensing bins, each one of the bins associated with a dispensing mechanism such as the wheel described above. The dispensing bins are designated as follows: non-diamond (e.g. simulants such as cubic zirconia); synthetic; pass/natural; refer (for gemstones whose properties have not been conclusively determined); and purge (for use when it is desired to quickly empty the apparatus of gemstones).

An exemplary method of sorting gemstones, optionally small melee stones as described above, is illustrated in FIG. 10. In this example, the method comprises receiving one or more gemstones at a collection location; determining, at the collection location, that one of the one or more gemstones is correctly oriented; transferring the oriented gemstone from the collection location onto a moveable surface using an automated arm; transporting the gemstone upon the moveable surface to one or more measurement locations; measuring one or more properties of the gemstone at the one or more measurement locations while the gemstone is supported upon the moveable surface; and sorting the gemstone based upon the one or more measured properties.

In a specific, non-limiting example, sorting of gemstones takes place as follows. A parcel of stones is dispensed into the hopper. The hopper is then vibrated, for example, using a device such as an Asyril Asycube vibrator, so that the stones travel along the interior surface of the hopper towards the dam. The gemstones pass through the dam in a controlled manner, and fall onto a surface of the light table, and arrive at the collection location. Once at the collection location, the gemstones are imaged in order to determine their orientation. Gemstones that are correctly oriented, typically in a table-down orientation, are designated for pick-up by the automated arm. Gemstones that are not correctly oriented, typically not in a table-down orientation, are re-oriented by vibration of the light table. The re-oriented gemstones are imaged again and a further determination of their orientation is made. Once a re-oriented stone is determined to be in a table-down orientation, the stone is designated for pick-up by the automated arm. In one example, once an image of the gemstones on the light table has been obtained, the controller controls the automated arm to transfer all correctly oriented stones to the moveable surface before the light table is vibrated again and a further image is obtained.

The automated arm comprises a vacuum nozzle that enables a single gemstone to be held thereon. The arm is actuated to transfer the stone held on the nozzle to the movable surface, where the stone is dispensed by application of positive pressure. Placement of the gemstone on the surface of the moveable surface is controlled by an annular collar around the vacuum nozzle. The moveable surface is stationary while the gemstone is dispensed off the nozzle onto the moveable surface.

The gemstone, still correctly oriented, typically table-down, is transported on the moveable surface to a first measurement location. Here, the moveable surface is halted while a first measurement of the stone is obtained. Then, the gemstone is further transported on the moveable surface to a second measurement location. Here, the speed of the moveable disc is reduced such that the gemstone passes slowly through the second measurement location while a second measurement of the stone is obtained. The stone is illuminated at the second measurement location by a beam at a shallow angle of around 10 degrees off the horizontal.

Once the stone has passed through the second measurement location, the moveable surface accelerates back to normal transportation speed and the gemstone is transported to a dispensing location where it is dispensed off the moveable surface into a specific dispensing bin, based upon the measurements obtained at the first and second measurement locations.

Multiple stones can be present on the moveable surface at any one time: for example, one stone being placed on the moveable surface by the automated arm; another stone being measured at the first measurement location, a further stone being measured (or about to be measured, or just having been measured) at the second measurement location, and yet a further stone being dispensed into a dispensing bin.

The skilled person will appreciate that various modifications may be made to the above-described embodiments, without departing from the scope as set out in the following claims. For example, embodiments described herein may be combined, and one or more features of one embodiment may be substituted for one of more features of another embodiment, without limitation.

The invention claimed is:

1. A method of sorting gemstones, the method comprising:

receiving one or more gemstones at a collection location;

determining, at the collection location, that one of the one or more gemstones is correctly oriented;

transferring the correctly oriented gemstone from the collection location onto a moveable surface using an automated arm;

transporting the gemstone upon the moveable surface to one or more measurement locations;

measuring one or more properties of the gemstone at the one or more measurement locations while the gemstone is supported upon the moveable surface; and sorting the gemstone based upon the one or more properties.

2. The method according to claim 1, wherein the gemstones are substantially between 0.1 to 0.3 points.

3. The method according to claim 1, wherein the moveable surface is a rotatable disc.

4. The method according to claim 3, wherein the transferring comprises:

halting the rotatable disc dispensing the gemstone onto a surface of the rotatable disc; and turning the rotatable disc by a predetermined angle, wherein the predetermined angle is 9 degrees.

5. The method according to claim 1, comprising transferring a first correctly oriented gemstone onto the moveable surface, while the moveable surface is stationary, while measuring one or more properties of a second gemstone at the one or more measurement locations.

6. The method according to claim 5, comprising transferring the first correctly oriented gemstone onto the moveable surface, while the moveable surface is stationary, while measuring one or more properties of the second gemstone at the one or more measurement locations, and while dispensing a third gemstone off the moveable surface.

7. The method according to claim 1, comprising measuring one or more properties of a first gemstone at the one or more measurement locations while transporting a second gemstone upon the moveable surface, wherein the moveable surface is non-stationary.

8. The method according to claim 1, wherein one of the one or more measurement locations comprises one of a luminescence measurement cell or a photoluminescence measurement cell.

9. The method according to claim 1, wherein measuring the one or more properties of the gemstone comprises illuminating the gemstone using a beam of light having an incidence angle of substantially 10 degrees measured from a horizontal plane.

10. The method according to claim 9, comprising transporting the gemstone through the one or more measurement locations during the measuring.

11. The method according to claim 1, wherein each of the one or more gemstones is sorted based upon one or more measurement results identifying the gemstone as natural or synthetic.

12. The method according to claim 1, comprising moving the moveable surface at a first speed and at a second speed, wherein the second speed is less than the first speed.

13. The method according to claim 1, comprising sorting the gemstones by further transporting the gemstone to a dispensing location and dispensing the gemstone off the moveable surface based upon the one or more properties of the gemstone.

14. The method according to claim 1, comprising receiving one or more gemstones at the collection location from a hopper, and controlling, by the hopper, a flow of the one or more gemstones onto the collection location.

15. The method according to claim 14, comprising:

controlling the flow of the one or more gemstones via an end hopper wall, the end hopper wall defining an aperture at a base thereof; and providing the hopper with at least one substantially curved internal surface.

16. The method according to claim 1, comprising obtaining an image of one of the one or more gemstones at the collection location and analysing the obtained image to determine an orientation of the gemstone, wherein when the orientation is determined to be correct, the imaged gemstone is designated for transfer to the moveable surface, and wherein when the orientation is determined to be incorrect, the collection location is caused to vibrate such that the imaged gemstone is re-oriented.

17. The method according to claim 16, comprising causing the collection location to vibrate once all gemstones at the collection location that are determined to be correctly oriented have been transferred from the collection location onto the moveable surface.

18. The method according to claim 16, wherein the orientation is determined to be correct when the imaged gemstone is determined to be in a table-down orientation.

19. The method according to claim 1, comprising providing the automated arm with a vacuum nozzle at one end thereof, supplying negative pressure to an aperture of the vacuum nozzle in order to pick up an individual gemstone with the aperture, and supplying positive pressure to the vacuum nozzle in order to dispense the gemstone off the aperture onto the moveable surface.

20. The method according to claim 19, comprising providing the vacuum nozzle with an annular collar and substantially surrounding the aperture with the annular collar while the gemstone is being dispensed off the aperture.

21. The method according to claim 1, comprising:

measuring one or more properties of the gemstone at the one or more measurement locations while the moveable surface is stationary; and measuring one or more properties of the gemstone at the one or more measurement locations while the moveable surface is non-stationary.

22. An apparatus for sorting gemstones, comprising:

a collection location configured to receive one or more gemstones;

an image capture device configured to obtain one or more images of the one or more gemstones at the collection location;

a processor configured to analyse the one or more images and to determine whether one or more of the one or more gemstones is correctly oriented;

an automated arm configured to transfer a correctly oriented gemstone from the collection location onto a moveable surface;

the moveable surface, configured to transport the gemstone to one or more measurement locations; and the one or more measurement locations, configured to measure one or more properties of the gemstone while the gemstone is supported upon the moveable surface.

23. The apparatus according to claim 22, wherein the gemstones are substantially between 0.1 to 0.3 points.

24. The apparatus according to claim 22, wherein the moveable surface is a rotatable disc.

25. The apparatus according to claim 24, further comprising a controller configured to incrementally move the rotatable disc through a predetermined angle, preferably 9 degrees.

26. The apparatus according to claim 25, wherein the controller is configured to control the moveable surface to be stationary during transfer of the gemstone onto the moveable surface.

27. The apparatus according to claim 25, wherein the controller is configured to control the moveable surface to be non-stationary during measurement of one or more properties of a gemstone.

28. The apparatus according to claim 22, wherein one of the one or more measurement locations comprises one of: a luminescence measurement cell, or a photoluminescence measurement cell.

29. The apparatus according to claim 22, further comprising an illumination arrangement at one or more of the measurement locations, configured to illuminate the gemstone supported upon the moveable surface at a predetermined illumination angle, preferably an illumination angle of substantially 10 degrees measured from a horizontal plane.

30. The apparatus according to claim 22, wherein the moveable surface is controlled to move at a first speed and at a second, lower speed, the moveable surface configured to move at the second, lower speed as the gemstone is transported through one of the one or more measurement locations.

31. The apparatus according to claim 22, comprising one or more dispensing locations, each including a dispensing mechanism and a dispensing bin.

32. The apparatus according to claim 22, comprising a hopper configured to provide one or more gemstones to the collection location, wherein the hopper is provided with an end wall defining an aperture at a base thereof, and wherein the hopper is configured to control a flow of gemstones to the collection location via the aperture.

33. The apparatus according to claim 32, wherein a body of the hopper generally slopes towards the aperture at an angle of substantially 3 degrees measured from horizontal, and/or wherein the end wall is inwardly angled at an angle of substantially 75 degrees measured from horizontal.

34. The apparatus according to claim 22, comprising a vibration mechanism configured to vibrate the collection location in order to correctly orient one or more of the gemstones at the collection location.

35. The apparatus according to claim 22, comprising a vacuum nozzle connected to an end of the automated arm, said vacuum nozzle comprising an aperture for receiving a gemstone and an annular collar configured to surround the aperture.

* * * * *